US008168291B2

(12) United States Patent
Shah et al.

(10) Patent No.: US 8,168,291 B2
(45) Date of Patent: May 1, 2012

(54) CERAMIC COMPOSITE MATERIALS CONTAINING CARBON NANOTUBE-INFUSED FIBER MATERIALS AND METHODS FOR PRODUCTION THEREOF

(75) Inventors: Tushar K. Shah, Columbia, MD (US); Harry C. Malecki, Abingdon, MD (US); Murray N. Carson, Essex, MD (US)

(73) Assignee: Applied Nanostructured Solutions, LLC, Baltimore, MD (US)

( * ) Notice: Subject to any disclaimer, the term of this patent is extended or adjusted under 35 U.S.C. 154(b) by 0 days.

(21) Appl. No.: 12/953,434

(22) Filed: Nov. 23, 2010

(65) Prior Publication Data
US 2011/0124483 A1    May 26, 2011

Related U.S. Application Data

(60) Provisional application No. 61/263,804, filed on Nov. 23, 2009, provisional application No. 61/265,718, filed on Dec. 1, 2009.

(51) Int. Cl.
*B32B 15/04* (2006.01)
(52) U.S. Cl. .................. 428/293.4; 428/293.1; 501/95.2; 977/742
(58) Field of Classification Search .............. 428/293.4, 428/293.1, 294.7, 294.1; 501/95.2; 977/742
See application file for complete search history.

(56) References Cited

U.S. PATENT DOCUMENTS

| | | |
|---|---|---|
| 2,412,707 A | 12/1946 | Barnett |
| 3,304,855 A | 2/1967 | Oebell |
| 3,584,758 A | 6/1971 | Moore |
| 4,104,083 A | 8/1978 | Hirano |
| 4,515,107 A | 5/1985 | Fournier et al. |
| 4,530,750 A | 7/1985 | Aisenberg et al. |
| 4,566,969 A | 1/1986 | Klein |
| 4,707,349 A | 11/1987 | Hjersted |

(Continued)

FOREIGN PATENT DOCUMENTS
CN    101698975    4/2010
(Continued)

OTHER PUBLICATIONS
Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

(Continued)

*Primary Examiner* — N. Edwards
(74) *Attorney, Agent, or Firm* — McDermott Will & Emery LLP

(57) ABSTRACT

In various embodiments, composite materials containing a ceramic matrix and a carbon nanotube-infused fiber material are described herein. Illustrative ceramic matrices include, for example, binary, ternary and quaternary metal or non-metal borides, oxides, nitrides and carbides. The ceramic matrix can also be a cement. The fiber materials can be continuous or chopped fibers and include, for example, glass fibers, carbon fibers, metal fibers, ceramic fibers, organic fibers, silicon carbide fibers, boron carbide fibers, silicon nitride fibers and aluminum oxide fibers. The composite materials can further include a passivation layer overcoating at least the carbon nanotube-infused fiber material and, optionally, the plurality of carbon nanotubes. The fiber material can be distributed uniformly, non-uniformly or in a gradient manner in the ceramic matrix. Non-uniform distributions may be used to form impart different mechanical, electrical or thermal properties to different regions of the ceramic matrix.

28 Claims, 7 Drawing Sheets

U.S. PATENT DOCUMENTS

| | | | |
|---|---|---|---|
| 4,920,917 A | 5/1990 | Nakatani et al. | |
| 5,093,155 A | 3/1992 | Miyazaki et al. | |
| 5,130,194 A | 7/1992 | Baker et al. | |
| 5,156,225 A | 10/1992 | Murrin | |
| 5,173,367 A | 12/1992 | Liimatta et al. | |
| 5,221,605 A | 6/1993 | Bard et al. | |
| 5,227,238 A | 7/1993 | Hirai et al. | |
| 5,238,808 A | 8/1993 | Bard et al. | |
| 5,246,794 A | 9/1993 | Blomgren et al. | |
| 5,310,687 A | 5/1994 | Bard et al. | |
| 5,470,408 A | 11/1995 | Nielson et al. | |
| 5,514,217 A | 5/1996 | Niino et al. | |
| 5,547,525 A | 8/1996 | Bennett et al. | |
| 5,571,749 A | 11/1996 | Matsuda et al. | |
| 5,639,984 A | 6/1997 | Nielson | |
| 5,714,089 A | 2/1998 | Bard et al. | |
| 5,731,147 A | 3/1998 | Bard et al. | |
| 5,908,585 A | 6/1999 | Shibuta | |
| 5,968,274 A | 10/1999 | Fujioka et al. | |
| 5,997,832 A | 12/1999 | Lieber et al. | |
| 6,140,138 A | 10/2000 | Bard et al. | |
| 6,146,783 A | 11/2000 | Brohm et al. | |
| 6,184,280 B1 | 2/2001 | Shibuta | |
| 6,221,154 B1 | 4/2001 | Lee et al. | |
| 6,232,706 B1 | 5/2001 | Dai et al. | |
| 6,251,520 B1 | 6/2001 | Blizzard et al. | |
| 6,265,466 B1 | 7/2001 | Glatkowski et al. | |
| 6,331,209 B1 | 12/2001 | Jang et al. | |
| 6,333,016 B1 | 12/2001 | Resasco et al. | |
| 6,361,861 B2 | 3/2002 | Gao | |
| 6,413,487 B1 | 7/2002 | Resasco et al. | |
| 6,420,293 B1 | 7/2002 | Chang et al. | |
| 6,455,021 B1 | 9/2002 | Saito | |
| 6,465,057 B1 | 10/2002 | Nakahigashi et al. | |
| 6,479,028 B1 | 11/2002 | Kaner et al. | |
| 6,479,030 B1 | 11/2002 | Firsich | |
| 6,491,789 B2 | 12/2002 | Niu | |
| 6,495,258 B1 | 12/2002 | Chen et al. | |
| 6,528,572 B1 | 3/2003 | Patel et al. | |
| 6,564,744 B2 | 5/2003 | Nakahigashi et al. | |
| 6,653,619 B2 | 11/2003 | Chin et al. | |
| 6,673,392 B2 | 1/2004 | Lee et al. | |
| 6,692,717 B1 | 2/2004 | Smalley et al. | |
| 6,699,525 B2 | 3/2004 | Jayatissa | |
| 6,764,628 B2 | 7/2004 | Lobovsky et al. | |
| 6,765,949 B2 | 7/2004 | Chang | |
| 6,790,425 B1 | 9/2004 | Smalley et al. | |
| 6,818,821 B2 | 11/2004 | Fujieda et al. | |
| 6,837,928 B1 | 1/2005 | Zhang et al. | |
| 6,852,410 B2 | 2/2005 | Veedu et al. | |
| 6,863,942 B2 | 3/2005 | Ren et al. | |
| 6,887,451 B2 | 5/2005 | Dodelet et al. | |
| 6,900,264 B2 | 5/2005 | Kumar et al. | |
| 6,900,580 B2 | 5/2005 | Dai et al. | |
| 6,908,572 B1 | 6/2005 | Derbyshire et al. | |
| 6,913,075 B1 | 7/2005 | Knowles et al. | |
| 6,934,600 B2 | 8/2005 | Jang et al. | |
| 6,936,653 B2 | 8/2005 | McElrath et al. | |
| 6,955,800 B2 | 10/2005 | Resasco et al. | |
| 6,962,892 B2 | 11/2005 | Resasco et al. | |
| 6,967,013 B2 | 11/2005 | Someya et al. | |
| 6,979,709 B2 | 12/2005 | Smalley et al. | |
| 6,986,853 B2 | 1/2006 | Glatkowski et al. | |
| 6,986,877 B2 | 1/2006 | Takikawa et al. | |
| 6,994,907 B2 | 2/2006 | Resasco et al. | |
| 7,011,760 B2 | 3/2006 | Wang et al. | |
| 7,018,600 B2 | 3/2006 | Yanagisawa et al. | |
| 7,022,776 B2 | 4/2006 | Bastiaens et al. | |
| 7,045,108 B2 | 5/2006 | Jiang et al. | |
| 7,056,452 B2 | 6/2006 | Niu et al. | |
| 7,074,294 B2 | 7/2006 | Dubrow | |
| 7,094,386 B2 | 8/2006 | Resasco et al. | |
| 7,105,596 B2 | 9/2006 | Smalley et al. | |
| 7,108,841 B2 | 9/2006 | Smalley et al. | |
| 7,118,693 B2 | 10/2006 | Glatkowski et al. | |
| 7,125,502 B2 | 10/2006 | Smalley et al. | |
| 7,125,534 B1 | 10/2006 | Smalley et al. | |
| 7,132,621 B2 | 11/2006 | Kumar et al. | |
| 7,144,563 B2 | 12/2006 | Rao et al. | |
| 7,148,619 B2 | 12/2006 | Den et al. | |
| 7,151,129 B2 | 12/2006 | Ishikawa et al. | |
| 7,153,452 B2 | 12/2006 | Ogale et al. | |
| 7,157,068 B2 | 1/2007 | Li et al. | |
| 7,160,532 B2 | 1/2007 | Liu et al. | |
| 7,211,320 B1 | 5/2007 | Cooper et al. | |
| 7,226,643 B2 | 6/2007 | Juang et al. | |
| 7,235,159 B2 | 6/2007 | Gu et al. | |
| 7,253,442 B2 | 8/2007 | Huang et al. | |
| 7,261,779 B2 | 8/2007 | Gardner | |
| 7,265,174 B2 | 9/2007 | Carroll et al. | |
| 7,265,175 B2 | 9/2007 | Winey et al. | |
| 7,278,324 B2 | 10/2007 | Smits et al. | |
| 7,285,591 B2 | 10/2007 | Winey et al. | |
| 7,294,302 B2 | 11/2007 | Koide et al. | |
| 7,329,698 B2 | 2/2008 | Noguchi et al. | |
| 7,338,684 B1 | 3/2008 | Curliss et al. | |
| 7,354,881 B2 | 4/2008 | Resasco et al. | |
| 7,354,988 B2 | 4/2008 | Charati et al. | |
| 7,372,880 B2 | 5/2008 | Jablonski et al. | |
| 7,384,663 B2 | 6/2008 | Olry et al. | |
| 7,399,794 B2 | 7/2008 | Harmon et al. | |
| 7,407,640 B2 | 8/2008 | Barrera et al. | |
| 7,407,901 B2 | 8/2008 | Bystricky et al. | |
| 7,410,628 B2 | 8/2008 | Bening et al. | |
| 7,411,019 B1 | 8/2008 | Bley | |
| 7,419,601 B2 | 9/2008 | Cooper et al. | |
| 7,431,965 B2 | 10/2008 | Grigorian et al. | |
| 7,442,284 B2 | 10/2008 | Ren et al. | |
| 7,445,817 B2 | 11/2008 | Kumar et al. | |
| 7,448,441 B2 | 11/2008 | Hendricks et al. | |
| 7,448,931 B2 | 11/2008 | Liu et al. | |
| 7,459,627 B2 | 12/2008 | Lee et al. | |
| 7,465,605 B2 | 12/2008 | Raravikar et al. | |
| 7,473,466 B1 | 1/2009 | Muradov | |
| 7,479,052 B2 | 1/2009 | Kim et al. | |
| 7,488,455 B2 | 2/2009 | Dai et al. | |
| 7,504,078 B1 | 3/2009 | Jacques et al. | |
| 7,510,695 B2 | 3/2009 | Smalley et al. | |
| 7,534,486 B2 | 5/2009 | Boerstoel et al. | |
| 7,544,415 B2 | 6/2009 | Chen et al. | |
| 7,563,411 B2 | 7/2009 | Jiang et al. | |
| 7,563,428 B2 | 7/2009 | Resasco et al. | |
| 7,569,425 B2 | 8/2009 | Huang et al. | |
| 7,588,700 B2 | 9/2009 | Kwon et al. | |
| 7,592,248 B2 | 9/2009 | Ventzek et al. | |
| 7,597,869 B2 | 10/2009 | Hsiao | |
| 7,608,798 B2 | 10/2009 | Kumar et al. | |
| 7,611,579 B2 | 11/2009 | Lashmore et al. | |
| 7,615,204 B2 | 11/2009 | Ajayan et al. | |
| 7,615,205 B2 | 11/2009 | Jiang et al. | |
| 7,632,550 B2 | 12/2009 | Mizuno et al. | |
| 7,632,569 B2 | 12/2009 | Smalley et al. | |
| 7,700,943 B2 | 4/2010 | Raravikar et al. | |
| 7,709,087 B2 | 5/2010 | Majidi et al. | |
| 7,718,220 B2 | 5/2010 | D'Silva et al. | |
| 7,771,798 B1 | 8/2010 | Grosse et al. | |
| 7,776,777 B2 | 8/2010 | Kim et al. | |
| 7,811,632 B2 | 10/2010 | Eres | |
| 7,815,820 B2 | 10/2010 | Tan et al. | |
| 7,816,709 B2 | 10/2010 | Balzano et al. | |
| 7,862,795 B2 | 1/2011 | Zhang et al. | |
| 7,867,468 B1 | 1/2011 | Haddon et al. | |
| 7,867,616 B2 * | 1/2011 | Harutyunyan | 428/408 |
| 7,871,591 B2 | 1/2011 | Harutyunyan et al. | |
| 7,880,376 B2 | 2/2011 | Takai et al. | |
| 7,927,701 B2 | 4/2011 | Curliss et al. | |
| 2002/0035170 A1 | 3/2002 | Glatkowski et al. | |
| 2002/0085968 A1 | 7/2002 | Smalley et al. | |
| 2003/0024884 A1 | 2/2003 | Petrik | |
| 2003/0042147 A1 | 3/2003 | Talin et al. | |
| 2003/0044678 A1 | 3/2003 | ESq. | |
| 2003/0102585 A1 | 6/2003 | Poulin et al. | |
| 2003/0111333 A1 | 6/2003 | Montgomery et al. | |
| 2003/0166744 A1 | 9/2003 | Van Dijk et al. | |
| 2004/0007955 A1 | 1/2004 | Yaniv et al. | |
| 2004/0026234 A1 | 2/2004 | Vanden Brande et al. | |
| 2004/0082247 A1 | 4/2004 | Desai et al. | |

| | | |
|---|---|---|
| 2004/0105807 A1 | 6/2004 | Fan et al. |
| 2004/0171725 A1 | 9/2004 | Richardson et al. |
| 2004/0184981 A1 | 9/2004 | Liu et al. |
| 2004/0245088 A1* | 12/2004 | Gardner ............ 204/173 |
| 2004/0253167 A1 | 12/2004 | Silva et al. |
| 2005/0005554 A1 | 1/2005 | Oppermanm |
| 2005/0042163 A1 | 2/2005 | Allison et al. |
| 2005/0081752 A1 | 4/2005 | Snyder et al. |
| 2005/0090024 A1 | 4/2005 | Chopra |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0119371 A1 | 6/2005 | Drzal et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0230560 A1 | 10/2005 | Glatkowski et al. |
| 2005/0260120 A1 | 11/2005 | Smalley et al. |
| 2005/0260412 A1 | 11/2005 | Gardner et al. |
| 2005/0263456 A1 | 12/2005 | Cooper et al. |
| 2005/0287064 A1 | 12/2005 | Mayne et al. |
| 2006/0047052 A1 | 3/2006 | Barrera et al. |
| 2006/0052509 A1 | 3/2006 | Saitoh |
| 2006/0057361 A1 | 3/2006 | Ounaies et al. |
| 2006/0062944 A1 | 3/2006 | Gardner et al. |
| 2006/0099135 A1 | 5/2006 | Yodh et al. |
| 2006/0110599 A1 | 5/2006 | Honma et al. |
| 2006/0121275 A1 | 6/2006 | Poulin et al. |
| 2006/0159916 A1 | 7/2006 | Dubrow et al. |
| 2006/0166003 A1 | 7/2006 | Khabashesku et al. |
| 2006/0177602 A1 | 8/2006 | Dijon et al. |
| 2006/0198956 A1 | 9/2006 | Eres |
| 2007/0020167 A1 | 1/2007 | Han et al. |
| 2007/0048521 A1 | 3/2007 | Istvan |
| 2007/0054105 A1 | 3/2007 | Hsiao |
| 2007/0087198 A1 | 4/2007 | Dry |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0135588 A1 | 6/2007 | Diakoumakos et al. |
| 2007/0189953 A1 | 8/2007 | Bai et al. |
| 2007/0259128 A1 | 11/2007 | Parsapour |
| 2007/0265379 A1 | 11/2007 | Chen et al. |
| 2008/0014431 A1 | 1/2008 | Lashmore et al. |
| 2008/0020193 A1 | 1/2008 | Jang et al. |
| 2008/0048364 A1 | 2/2008 | Armeniades et al. |
| 2008/0053922 A1 | 3/2008 | Honsinger, Jr. et al. |
| 2008/0075954 A1 | 3/2008 | Wardle et al. |
| 2008/0118753 A1 | 5/2008 | Poulin et al. |
| 2008/0137890 A1 | 6/2008 | Petersen et al. |
| 2008/0155888 A1 | 7/2008 | Vick et al. |
| 2008/0160286 A1 | 7/2008 | Asrar et al. |
| 2008/0160302 A1 | 7/2008 | Asrar et al. |
| 2008/0170982 A1 | 7/2008 | Zhang et al. |
| 2008/0173111 A1 | 7/2008 | Thostenson et al. |
| 2008/0176987 A1 | 7/2008 | Trevet et al. |
| 2008/0182108 A1 | 7/2008 | Curliss et al. |
| 2008/0187648 A1 | 8/2008 | Hart et al. |
| 2008/0237922 A1 | 10/2008 | Vaidyanathan et al. |
| 2008/0247938 A1 | 10/2008 | Tsai et al. |
| 2008/0248275 A1 | 10/2008 | Jang et al. |
| 2008/0279753 A1 | 11/2008 | Harutyunyan |
| 2008/0286564 A1 | 11/2008 | Tsosis |
| 2008/0311301 A1 | 12/2008 | Diss et al. |
| 2009/0017301 A1 | 1/2009 | Moireau |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0092832 A1 | 4/2009 | Moireau |
| 2009/0099016 A1 | 4/2009 | Carruthers et al. |
| 2009/0117363 A1 | 5/2009 | Wardle et al. |
| 2009/0121219 A1 | 5/2009 | Song et al. |
| 2009/0121727 A1 | 5/2009 | Lynch et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | Dufaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0277897 A1 | 11/2009 | Lashmore et al. |
| 2009/0286079 A1 | 11/2009 | Barker et al. |
| 2009/0294753 A1 | 12/2009 | Hauge et al. |
| 2009/0311166 A1 | 12/2009 | Hart et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0143701 A1 | 6/2010 | Zhu et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0124483 A1* | 5/2011 | Shah et al. ............ 501/32 |

FOREIGN PATENT DOCUMENTS

| | | |
|---|---|---|
| IN | 01900DE2008 A | 3/2010 |
| KR | 100829001 | 5/2008 |
| TW | 200833861 | 8/2008 |
| WO | WO 03/082733 | 10/2003 |
| WO | WO 2005/075341 | 8/2005 |
| WO | WO/2006/048531 A1 | 5/2006 |
| WO | WO/2006/115486 A1 | 11/2006 |
| WO | WO 2007/015710 | 2/2007 |
| WO | WO/2007/061854 A2 | 5/2007 |
| WO | WO/2007/089118 A1 | 8/2007 |
| WO | WO/2007/149109 A2 | 12/2007 |
| WO | WO/2008/041183 A2 | 4/2008 |
| WO | WO/2008/054541 A2 | 5/2008 |
| WO | WO/2008/085634 A1 | 7/2008 |
| WO | WO2008085634 * | 7/2008 |
| WO | WO 2008/112349 | 9/2008 |
| WO | WO/2008/115640 A2 | 9/2008 |
| WO | WO/2009/004346 A1 | 1/2009 |
| WO | WO 2009/103925 | 8/2009 |
| WO | WO 2009/110885 | 9/2009 |
| WO | WO 2009/124862 | 10/2009 |

OTHER PUBLICATIONS

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of PT nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang, et al., "Penetration depth of atmospheric pressure plasma surface modification into multiple layers of polyester fabrics", Surface and Coatings Technology, 2007, pp. 77-83, vol. 202, Elsevier B.V.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elsevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH. 5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Bradford, et al., "Electrical Conductivity Study of Carbon nanotube Yarns, 3-D Hybrid Braids and their Composites", Journal of Composite Materials, 2008, pp. 1533-1545, vol. 42, No. 15, SAGE Productions, Los Angeles, London, New Delhi and Singapore.

Franz, et al., "Carbon Single-Wall Nanotube Growth in a Volumetrically Confined Arc Discharge System", U.S. Departement of Energy Journal of Undergraduate Research, 2004, pp. 66-69.

Yanagishita, et al., "Carbon Nanotubes with a Triangular Cross-section, Fabricated Using Anodic Porous Alumina as the Temple", Adv. Mater., 2004, pp. 429-432, vol. 16, No. 5, Wiley-VCH Verlag GmbH & Co. KGaA, Weinheim.

Vaccarini et al., "Reinforcement of an Epoxy Resin by Single Walled Nanotubes", AIP Conference Proceedings, Nov. 21, 2000, vol. 544, pp. 521-525.

U.S. Appl. No. 12/766,817, filed Apr. 23, 2010.

U.S. Appl. No. 61/295,621, filed Jan. 15, 2010.

U.S. Appl. No. 61/297,704, filed Jan. 22, 2010.

Kramer, et al., "Constrained Iron Catalysts for Single-Walled Carbon Nanotube Growth", Langmuir 2005, vol. 21, pp. 8466-8470, retrieved from <http://pubs.acs.org/doi/abs/10.1021/la0506729.

Wang, et al., "Processing and Property Investigation of Single-Walled Carbon Nanotube (SWNT) Buckypaper/Epoxy Resin Matrix Nanocomposite", Composites Part A: applied science and manufacturing, Oct. 1, 2004, pp. 1225-1232, Elsevier Science Publishers B.V., Netherlands.

Lux, "PCT Application No. PCT/US2007/086875 Search Report and Written Opinion", May 13, 2008.

Zhang et al., "Integration and characterization of aligned carbon nanotubes on metal/silicon substrates and effects of water", Applied Surface Science 255 (2009) 5003-5008, entire document.

U.S. Appl. No. 12/766,817, dated Apr. 23, 2010, Tushar K. Shah.

U.S. Appl. No. 61/295,621, dated Jan. 15, 2010, Harry C. Malecki.

U.S. Appl. No. 61/297,704, dated Jan. 22, 2010, Tushar K. Shah.

* cited by examiner

CERAMIC COMPOSITE MATERIALS CONTAINING CARBON NANOTUBE-INFUSED FIBER MATERIALS AND METHODS FOR PRODUCTION THEREOF

CROSS-REFERENCE TO RELATED APPLICATIONS

This application claims the benefit of priority under 35 U.S.C. §119 from U.S. Provisional Patent Application Ser. Nos. 61/263,804, filed Nov. 23, 2009, and 61/265,718, filed Dec. 1, 2009, each of which is incorporated herein by reference in its entirety. This application is also related to U.S. patent application Ser. Nos. 12/611,073, 12/611,101 and 12/611,103, all filed on Nov. 2, 2009.

STATEMENT REGARDING FEDERALLY SPONSORED RESEARCH OR DEVELOPMENT

Not applicable.

FIELD OF THE INVENTION

The present invention generally relates to composites and, more specifically, to fiber-reinforced ceramic composites.

BACKGROUND

Composite materials containing nanomaterials have been extensively studied over the past several years due to beneficial property enhancements that are realized at the nanoscale level. Carbon nanotubes, in particular, are a nanomaterial that has been extensively studied for use in composite materials due to their extreme strength and electrical conductivity. Although beneficial properties can be conveyed to composite matrices via incorporated nanomaterials, commercially viable production of composite materials containing nanomaterials, especially carbon nanotubes, has not been generally realized due to the complexity of incorporating nanomaterials therein. Issues that are frequently encountered when incorporating carbon nanotubes in a composite matrix can include, for example, increased viscosity upon carbon nanotube loading, gradient control problems, and uncertain carbon nanotube orientation.

In view of the foregoing, readily produced composite materials containing carbon nanotubes would be of substantial benefit in the art. The present invention satisfies this need and provides related advantages as well.

SUMMARY

In various embodiments, composite materials containing a ceramic matrix and a carbon nanotube-infused fiber material are described herein.

In some embodiments, the composite materials include a ceramic matrix, a first portion of a carbon nanotube-infused fiber material and a second portion of a carbon nanotube-infused fiber material. The first portion of a carbon nanotube-infused fiber material and the second portion of a carbon nanotube-infused fiber material are distributed in a first region and a second region of the ceramic matrix, respectively. An average length of the carbon nanotubes infused to the first portion and an average length of the carbon nanotubes infused to the second portion are chosen such that the first region of the ceramic matrix and the second region of the ceramic matrix have different mechanical, electrical, or thermal properties.

In some embodiments, articles containing composite materials containing a ceramic matrix and a carbon nanotube-infused fiber material are described herein.

In other various embodiments, methods for making composite materials containing a ceramic matrix and a carbon nanotube-infused fiber material are described herein. In some embodiments, the methods include providing a carbon nanotube-infused fiber material, distributing the carbon nanotube-infused fiber material in a green ceramic precursor, and curing the green ceramic precursor to form a composite material containing a ceramic matrix and a carbon nanotube-infused fiber material.

In still other embodiments, methods for making composite materials containing a cement ceramic matrix and a carbon nanotube-infused fiber material are described herein. The methods include providing a cement ceramic matrix, providing a carbon nanotube-infused fiber material, distributing the carbon nanotube-infused fiber material in the cement, and curing the cement to form a concrete containing the carbon nanotube-infused fiber material.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiments of the disclosure, wherein.

DETAILED DESCRIPTION

Figure 1:
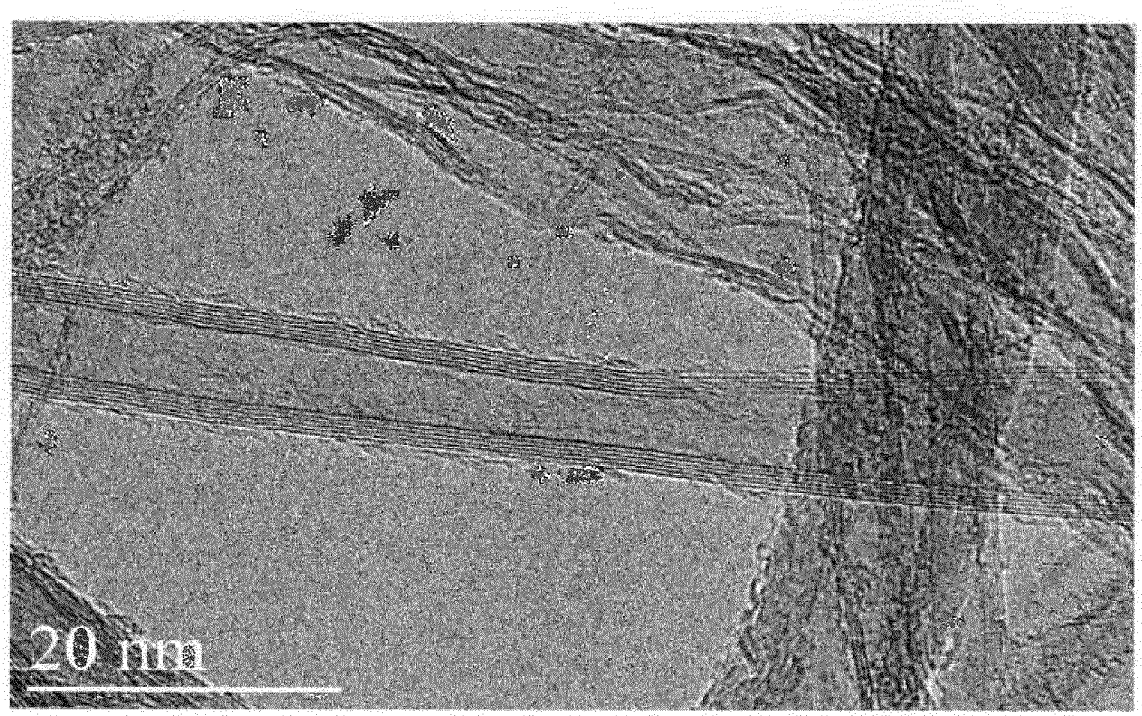
FIG. 1 shows an illustrative TEM image of carbon nanotubes that have been infused to carbon fibers.

The present disclosure is directed, in part, to composite materials containing a ceramic matrix and carbon nanotube-infused fiber materials. The present disclosure is also directed, in part, to methods for producing composite materials containing a ceramic matrix and carbon nanotube-infused fiber materials and articles containing such composite materials.

In composite materials containing a fiber material and a composite matrix, enhanced physical and/or chemical properties of the fiber material are imparted to the composite matrix (e.g., a ceramic matrix). In the present composite materials, these enhanced properties are further augmented by the carbon nanotubes infused to the fiber material. The carbon nanotube-infused fiber materials are a versatile platform for introducing carbon nanotubes into a composite matrix. Using carbon nanotube-infused fiber materials in composite materials allows significant problems associated with carbon nanotube incorporation therein to be overcome. In addition, by varying, for example, the length and density of coverage of the carbon nanotubes infused to the fiber material, different properties can be selectively conveyed to the composite material. For example, shorter carbon nanotubes can be used to convey structural support to the composite material. Longer carbon nanotubes, in addition to conveying structural support, can be used to establish an electrically conductive percolation pathway in a composite material that is normally poorly conductive or non-conductive. In addition, non-uniform or gradient placement of the carbon nanotube-infused fiber materials in different regions of the composite material can be used to selectively convey desired properties to the different composite material regions.

Applications of composite materials, particularly those containing cements and other ceramic matrices, continue to expand. Existing and new applications for these composite materials continue to push the limits of current fiber reinforcement technologies. Composite materials containing fiber materials infused with carbon nanotubes are one way in which current technological barriers can be overcome to provide composite materials having both improved structural strength and additional beneficial properties such as, for example, electrical conductivity, and thermal conductivity. A particularly beneficial consequence of conveying electrical conductivity to a composite material is that the composite material can provide electromagnetic interference (EMI) shielding, which is not possible in non-conductive composite materials containing conventional fiber materials. The composite materials having EMI shielding properties can be used in stealth applications and other situations where EMI shielding is important. EMI shielding applications for conventional composite materials, particularly ceramic composite materials, have been previously unexplored because they are normally non-conductive and not operable to provide EMI shielding effects. A number of other potential applications exist for composite materials containing carbon nanotube-infused fiber materials in which it is desirable to provide structural reinforcement to the composite matrix.

As used herein, the term "ceramic matrix" refers to a binary, tertiary, quaternary or higher order ceramic material that can serve to organize carbon nanotube-infused fiber materials into particular orientations, including random orientations. Ceramic matrices include, but are not limited to, oxides, carbides, borides and nitrides. Ceramic matrices can also include a cement that contains a ceramic material. In a composite material, the ceramic matrix benefits from having the carbon nanotube-infused fiber materials contained therein via enhancement of the structural, electrical and/or thermal properties, for example.

As used herein, the term "infused" refers to being bonded and "infusion" refers to the process of bonding. As such, a carbon nanotube-infused fiber material refers to a fiber material that has carbon nanotubes bonded thereto. Such bonding of carbon nanotubes to a fiber material can involve covalent bonding, ionic bonding, pi-pi interactions, and/or van der Waals force-mediated physisorption. In some embodiments, the carbon nanotubes are directly bonded to the fiber material. In other embodiments, the carbon nanotubes are indirectly bonded to the fiber material via a barrier coating and/or a catalytic nanoparticle used to mediate growth of the carbon nanotubes. The particular manner in which the carbon nanotubes are infused to the fiber material can be referred to as the bonding motif.

As used herein, the term "nanoparticle" refers to particles having a diameter between about 0.1 nm and about 100 nm in equivalent spherical diameter, although the nanoparticles need not necessarily be spherical in shape.

As used herein, the term "passivation layer" refers to a layer that is deposited on at least a portion of a carbon nanotube-infused fiber material to prevent or substantially inhibit a reaction of the fiber material and/or the carbon nanotubes infused thereon. Passivation layers can be beneficial, for example, to prevent or substantially inhibit a reaction during formation of the composite material when high temperatures can be encountered. In addition, the passivation layer can prevent or substantially inhibit a reaction with atmospheric components prior to or after formation of the composite material. Illustrative materials for passivation layers can include, for example, electroplated nickel, chromium, magnesium, titanium, silver, tin or titanium diboride.

As used herein, the terms "sizing agent," or "sizing," collectively refer to materials used in the manufacture of fiber materials as a coating to protect the integrity of the fiber material, to provide enhanced interfacial interactions between the fiber material and the ceramic matrix in a composite, and/or to alter and/or to enhance certain physical properties of the fiber material.

As used herein, the term "spoolable dimensions" refers to fiber materials that have at least one dimension that is not limited in length, allowing the fiber material to be stored on a spool or mandrel following infusion with carbon nanotubes. Fiber materials of "spoolable dimensions" have at least one dimension that indicates the use of either batch or continuous processing for carbon nanotube infusion to the fiber material.

As used herein, the term "transition metal" refers to any element or alloy of elements in the d-block of the periodic table (Groups 3 through 12), and the term "transition metal salt" refers to any transition metal compound such as, for example, transition metal oxides, carbides, nitrides, and the like. Illustrative transition metal catalytic nanoparticles include, for example, Ni, Fe, Co, Mo, Cu, Pt, Au, Ag, alloys thereof, salts thereof, and mixtures thereof.

As used herein, "uniform in length" refers to a condition in which the carbon nanotubes have lengths with tolerances of plus or minus about 20% or less of the total carbon nanotube length, for carbon nanotube lengths ranging between about 1 μm to about 500 μm. At very short carbon nanotube lengths (e.g., about 1 μm to about 4 μm), the tolerance can be plus or minus about 1 μm, that is, somewhat more than about 20% of the total carbon nanotube length.

As used herein, "uniform in density distribution" refers to a condition in which the carbon nanotube density on the fiber material has a tolerance of plus or minus about 10% coverage over the fiber material surface area that is covered by carbon nanotubes.

In various embodiments, composite materials containing a ceramic matrix and a carbon nanotube-infused fiber material are described herein.

Figure 2:
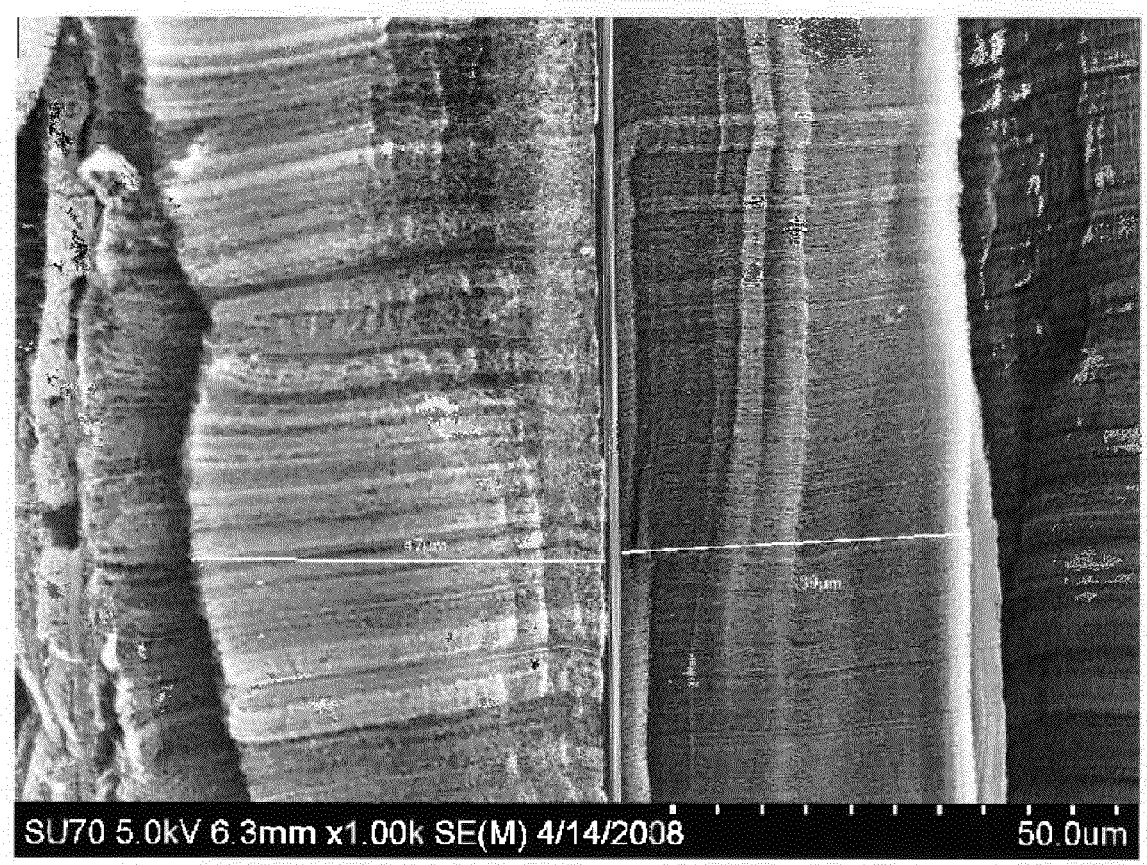
FIG. 2 shows an illustrative SEM image of a carbon fiber that has been infused with carbon nanotubes, where the carbon nanotubes are within +20% of a targeted length of 40 µm.

Fiber materials that have been infused with carbon nanotubes, including carbon fibers, ceramic fibers, metal fibers, and glass fibers, are described in applicants' co-pending U.S. patent application Ser. Nos. 12/611,073, 12/611,101, and 12/611,103, all filed on Nov. 2, 2009, each of which is incorporated herein by reference in its entirety. FIG. 1 shows an illustrative TEM image of carbon nanotubes that have been infused to carbon fibers. FIG. 2 shows an illustrative SEM image of a carbon fiber that has been infused with carbon nanotubes, where the carbon nanotubes are within +20% of a targeted length of 40 μm. In the images of FIGS. 1 and 2, the carbon nanotubes are multi-wall carbon nanotubes, although any carbon nanotubes such as single-wall carbon nanotubes, double-wall carbon nanotubes, and multi-wall carbon nanotubes having more than two walls can be used to infuse the fiber material of the present composite material.

The above fiber materials are merely illustrative of the various fiber materials that can be infused with carbon nanotubes and included in a composite material. In any of the various embodiments described herein, the fiber material that can be infused with carbon nanotubes includes, for example, glass fibers, carbon fibers, metal fibers, ceramic fibers, and organic fibers (e.g., aramid fibers). In some embodiments, the fiber materials include, for example, glass fibers, carbon fibers, metal fibers, ceramic fibers, organic fibers, silicon carbide (SiC) fibers, boron carbide ($B_4C$) fibers, silicon nitride ($Si_3N_4$) fibers, aluminum oxide ($Al_2O_3$) fibers and various combinations thereof. In some embodiments, the desirable properties of the carbon nanotubes are imparted to the fiber material to which they are infused and thereby enhance the ceramic matrix of the resultant composite material. One of ordinary skill in the art will recognize that any type of fiber material that can be infused with carbon nanotubes can also be used in the embodiments described herein to enhance a desired target property. Further, by varying the identity and/or fraction of the fiber material and/or the quantity of carbon nanotubes infused thereon, different properties can be addressed in the composite materials. Without being bound by theory or mechanism, Applicants believe that the fiber material structurally reinforces the ceramic matrix of the composite material.

In some embodiments, the carbon nanotube-infused fiber materials can be included in a composite material with fiber materials that are lacking carbon nanotubes. Illustrative combinations include, without limitation, carbon nanotube-infused glass fibers and ceramic fibers lacking carbon nanotube infusion, carbon nanotube-infused ceramic fibers and glass fibers lacking carbon nanotube infusion, carbon nanotube-infused carbon fibers and ceramic fibers lacking carbon nanotube infusion, and carbon nanotube-infused carbon fibers and glass fibers lacking carbon nanotube infusion. In addition, carbon nanotube-infused fibers of any type may be included in a composite material with fiber materials of like type that are lacking carbon nanotube infusion.

There are three types of carbon fibers that are categorized based on the precursors used to generate the fibers, any of which can be used in the various embodiments described herein: Rayon, Polyacrylonitrile (PAN) and Pitch. Carbon fibers from rayon precursors, which are cellulosic materials, have a relatively low carbon content of about 20%, and the fibers tend to have a low strength and stiffness. In contrast, Polyacrylonitrile (PAN) precursors provide carbon fibers having a carbon content of about 55% and an excellent tensile strength due to a minimum of surface defects. Pitch precursors based on petroleum asphalt, coal tar, and polyvinyl chloride can also be used to produce carbon fibers. Although pitches are relatively low in cost and high in carbon yield, there can be issues of non-uniformity in a given batch of the resultant carbon fibers.

Figure 3:
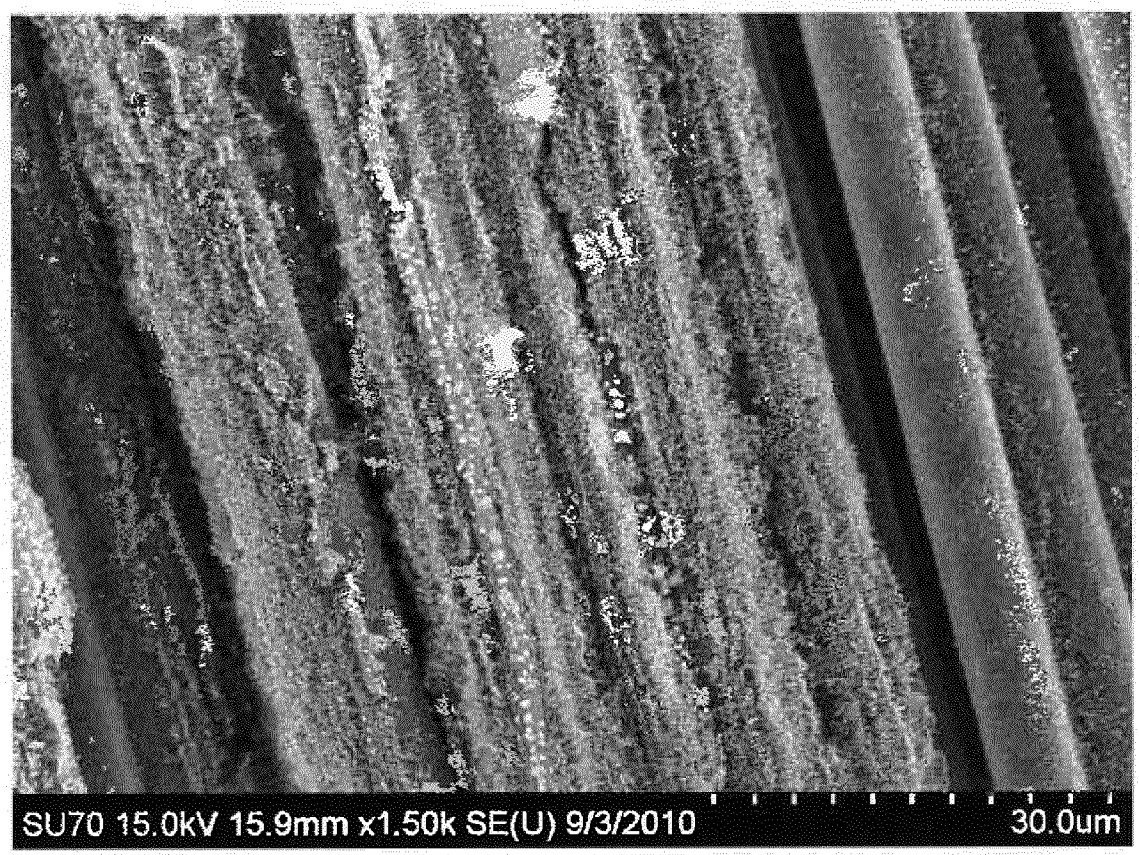
FIG. 3 shows an illustrative SEM image of a fabric weave of carbon nanotube-infused carbon fibers.

In various embodiments, the fiber material of the present composite materials can be in non-limiting forms of a filament, yarn, fiber tow, tape, fiber-braid, woven fabric, non-woven fabric, fiber ply and other three-dimensional woven or non-woven structures. For example, in embodiments in which the fiber material is a carbon fiber, the fiber material can be in non-limiting forms including a carbon filament, a carbon fiber yarn, a carbon fiber tow, a carbon tape, a carbon fiber-braid, a woven carbon fabric, a non-woven carbon fiber mat, a carbon fiber ply, and other three-dimensional woven or non-woven structures. FIG. 3 shows an illustrative SEM image of a fabric weave of carbon nanotube-infused carbon fibers. In various embodiments, carbon nanotubes of uniform length and distribution can be produced along spoolable lengths of filaments, fiber tows, tapes, fabrics and other three-dimensional woven structures. While various filaments, fiber tows, yarns, mats, woven and non-woven fabrics and the like can be directly infused with carbon nanotubes, it is also possible to generate such higher ordered structures from the parent fiber tow, yarn or the like from carbon nanotube-infused fibers. For example, a carbon nanotube-infused fiber material can be transformed into a woven fabric from a carbon nanotube-infused fiber tow.

Filaments include high aspect ratio fibers having diameters generally ranging in size between about 1 μm and about 100 μm.

Fiber tows are generally compactly associated bundles of carbon filaments, which can be twisted together to give yarns in some embodiments. Yarns include closely associated bundles of twisted filaments, wherein each filament diameter in the yarn is relatively uniform. Yarns have varying weights described by their 'tex,' (expressed as weight in grams per 1000 linear meters), or 'denier' (expressed as weight in pounds per 10,000 yards). For yarns, a typical tex range is usually between about 200 and about 2000.

Fiber braids represent rope-like structures of densely packed fibers. Such rope-like structures can be assembled from yarns, for example. Braided structures can include a hollow portion. Alternately, a braided structure can be assembled about another core material.

Fiber tows include loosely associated bundles of untwisted filaments. As in yarns, filament diameter in a fiber tow is generally uniform. Fiber tows also have varying weights and a tex range that is usually between about 200 and 2000. In addition, fiber tows are frequently characterized by the number of thousands of filaments in the fiber tow, such as, for example, a 12K tow, a 24K tow, a 48K tow, and the like.

Tapes are fiber materials that can be assembled as weaves or as non-woven flattened fiber tows, for example. Tapes can vary in width and are generally two-sided structures similar to a ribbon. In the various embodiments described herein, carbon nanotubes can be infused to the fiber material of a tape on one or both sides of a tape. In addition, carbon nanotubes of different types, diameters or lengths can be grown on each side of a tape. Advantages of having different types, diameters or lengths of carbon nanotubes infused on the fiber material are considered hereinafter. As described in Applicants' co-pending United States patent applications, infusion of carbon nanotubes to spools of tape can be conducted in a continuous manner.

In some embodiments, fiber materials can be organized into fabric or sheet-like structures. These include, for example, woven fabrics, non-woven fiber mats and fiber plies, in addition to the tapes described above. Such higher ordered structures can be assembled from parent fiber tows, yarns, filaments or the like, with carbon nanotubes already infused on the fiber material. As with tapes, such structures can also serve as a substrate for continuous infusion of carbon nanotubes thereon.

As described in applicants' co-pending applications, a fiber material is modified to provide a layer (typically no more than a monolayer) of catalytic nanoparticles on the fiber material for the purpose of growing carbon nanotubes thereon. In various embodiments, the catalytic nanoparticles used for mediating carbon nanotube growth are transition metals and various salts thereof.

In some embodiments, the fiber materials further include a barrier coating. Illustrative barrier coatings can include, for example, alkoxysilanes, methylsiloxanes, alumoxanes, alumina nanoparticles, spin on glass and glass nanoparticles. For example, in an embodiment the barrier coating is Accuglass T-11 Spin-On Glass (Honeywell International Inc., Morristown, N.J.). In some embodiments, the catalytic nanoparticles for carbon nanotube synthesis can be combined with the uncured barrier coating material and then applied to the fiber material together. In other embodiments, the barrier coating material can be added to the fiber material prior to deposition of the catalytic nanoparticles. In general, the barrier coating is sufficiently thin to allow exposure of the catalytic nanoparticles to a carbon feedstock gas for carbon nanotube growth. In some embodiments, the thickness of the barrier coating is less than or about equal to the effective diameter of the catalytic nanoparticles. In some embodiments, the thickness of the barrier coating is in a range between about 10 nm to about 100 nm. In other embodiments, the thickness of the barrier coating is in a range between about 10 nm to about 50 nm, including 40 nm. In some embodiments, the thickness of the barrier coating is less than about 10 nm, including about 1 nm, about 2 nm, about 3 nm, about 4 nm, about 5 nm, about 6 nm, about 7 nm, about 8 nm, about 9 nm, and about 10 nm, including all values and subranges therebetween.

Without being bound by theory, the barrier coating can serve as an intermediate layer between the fiber material and the carbon nanotubes and mechanically infuses the carbon nanotubes to the fiber material. Such mechanical infusion provides a robust system in which the fiber material serves as a platform for organizing the carbon nanotubes, while allowing the beneficial properties of the carbon nanotubes to be conveyed to the fiber material. Moreover, benefits of including a barrier coating include protection of the fiber material from chemical damage due to moisture exposure and/or thermal damage at the elevated temperatures used to promote carbon nanotube growth. In some embodiments, the barrier coating is removed before the carbon nanotube-infused fiber materials are incorporated in a composite material. However, in other embodiments, a composite material may contain a carbon nanotube-infused fiber material in which the barrier coating is intact.

After deposition of the catalytic nanoparticles, a chemical vapor deposition (CVD)-based process is used in some embodiments to continuously grow carbon nanotubes on the fiber material. The resultant carbon nanotube-infused fiber material is itself a composite architecture. More generally, the carbon nanotubes can be infused to the fiber material using any technique known to those of ordinary skill in the art. Illustrative techniques for carbon nanotube synthesis include, for example, micro-cavity, thermal or plasma-enhanced CVD techniques, laser ablation, arc discharge, and high pressure carbon monoxide (HiPCO) synthesis. In some embodiments, the CVD growth can be plasma-enhanced by providing an electric field during the growth process such that the carbon nanotubes follow the direction of the electric field.

The types of carbon nanotubes infused to the fiber materials of the present composites can generally vary without limitation. In the various embodiments herein, the carbon nanotubes infused on the fiber material can be, for example, any of a number of cylindrically-shaped allotropes of carbon of the fullerene family including single-walled carbon nanotubes (SWNTs), double-walled carbon nanotubes (DWNTs), multi-walled carbon nanotubes (MWNTs), and any combination thereof. In some embodiments, the carbon nanotubes can be capped with a fullerene-like structure. Stated another way, the carbon nanotubes have closed ends in such embodiments. However, in other embodiments, the carbon nanotubes remain open-ended. In some embodiments, the carbon nanotubes encapsulate other materials. In some embodiments, the carbon nanotubes are covalently functionalized after becoming infused to the fiber material. Functionalization can be used to increase the compatibility of the carbon nanotubes with certain ceramic matrices. In some embodiments, a plasma process is used to promote functionalization of the carbon nanotubes.

In some embodiments, the carbon nanotubes infused to the fiber material are substantially perpendicular to the longitudinal axis of the fiber material. Stated another way, the carbon nanotubes infused to the fiber material are circumferentially perpendicular to the fiber surface. In other embodiments, the carbon nanotubes infused to the fiber material are substantially parallel to the longitudinal axis of the fiber material.

In some embodiments, the carbon nanotubes infused to the fiber material are unbundled, thereby facilitating strong bonding between the fiber material and the carbon nanotubes. Unbundled carbon nanotubes allow the beneficial carbon nanotube properties to be expressed in the present composite materials. In other embodiments, the carbon nanotubes infused to the fiber material can be made in the form of a highly uniform, entangled carbon nanotube mat by reducing the growth density during carbon nanotube synthesis. In such embodiments, the carbon nanotubes do not grow dense enough to align the carbon nanotubes substantially perpendicular to the longitudinal axis of the fiber material.

In some embodiments, the amount of carbon nanotubes infused to the fiber material is selected such that at least one property of the composite material is enhanced relative to the ceramic matrix or the fiber material alone. Such properties can include, for example, tensile strength, Young's Modulus, shear strength, shear modulus, toughness, compression strength, compression modulus, density, electromagnetic wave absorptivity/reflectivity, acoustic transmittance, electrical conductivity, and thermal conductivity. The presence of carbon nanotubes in the composite materials also provide lighter end-product composite materials having a higher strength to weight ratio than a comparable composite material lacking carbon nanotubes.

In some embodiments, the fiber material can be infused with specific types of carbon nanotubes such that a desired property of the fiber material and, accordingly, the composite material can be attained. For example, the electrical properties of the composite material can be modified by infusing various types, chiralities, diameters, lengths, and densities of carbon nanotubes to the fiber material.

Electrical conductivity or specific conductance is a measure of a material's ability to conduct an electric current. Carbon nanotubes can be metallic, semimetallic or semiconducting depending on their chirality. A recognized system of nomenclature for designating a carbon nanotube's chirality is recognized by those of ordinary skill in the art and is distinguished by a double index (m,m), where n and m are integers that describe the cut and wrapping of hexagonal graphite when formed into a tubular structure. For example, when m=n, the carbon nanotube tube is said to be of the 'arm-chair' type. Such arm-chair carbon nanotubes, particularly single-wall carbon nanotubes, are metallic conductors and have extremely high electrical and thermal conductivity. In addition, such single-wall carbon nanotubes have extremely high tensile strength.

In addition to chirality, a carbon nanotube's diameter also influences its electrical conductivity and the related property of thermal conductivity. In the synthesis of carbon nanotubes, the carbon nanotube's diameter can be controlled by using catalytic nanoparticles of a given size. Typically, a carbon nanotube's diameter is approximately that of the catalytic nanoparticle that catalyzes its formation. Therefore, the carbon nanotube's properties can be additionally controlled by, for example, adjusting the size of the catalytic nanoparticles used to synthesize the carbon nanotubes. By way of non-limiting example, catalytic nanoparticles having a diameter of about 1 nm can be used to infuse a fiber material with single-wall carbon nanotubes. Larger catalytic nanoparticles can be used to prepare predominantly multi-wall carbon nanotubes, which have larger diameters because of their multiple nanotube layers, or mixtures of single-wall and multi-wall carbon nanotubes. Multi-wall carbon nanotubes typically have a more complex conductivity profile than do single-wall carbon nanotubes due to interwall reactions between the individual nanotube layers that can redistribute current non-uniformly. By contrast, there is no change in current across different portions of a single-wall carbon nanotube.

Because spacing of the fiber material in a composite material is typically greater than or equal to about one fiber diameter (e.g., about 5 µm to about 50 µm), carbon nanotubes of at least about one half of this length are used to establish an electrically conductive percolation pathway in the composite material. Such carbon nanotubes lengths can establish an electrically conductive percolation pathway via carbon nanotube to carbon nanotube bridging between adjacent fibers. Depending on the diameter of the fiber material and the spacing therebetween in the composite material, the carbon nanotube lengths can be adjusted accordingly to establish an electrically conductive percolation pathway. In applications where establishing an electrically conductive percolation pathway is not desired or necessary, carbon nanotubes having lengths shorter than the fiber diameter can be used to enhance structural properties. In some embodiments, the length of the carbon nanotubes infused to the fiber material can be controlled during carbon nanotube synthesis through modulation of carbon-containing feedstock gas flow rates and pressures, carrier gas flow rates and pressures, reaction temperatures and exposure time to the carbon nanotube growth conditions.

In some embodiments of the present composite materials, carbon nanotubes having varying lengths along different sections of the same continuous fiber material can be used. In such cases, the carbon nanotube-infused fiber materials can enhance more than one property of the ceramic matrix. For example, it can be desirable in a given composite material to have a first section of the fiber material infused with uniformly shorter carbon nanotubes to enhance shear strength or other structural properties and a second section of the fiber material infused with uniformly longer carbon nanotubes to enhance electrical or thermal conductivity properties.

In some embodiments, the carbon nanotubes infused to the fiber material are generally uniform in length. In some embodiments, an average length of the infused carbon nanotubes is between about 1 µm and about 500 µm, including about 1 µm, about 2 µm, about 3 µm, about 4 µm, about 5 µm, about 6 µm, about 7 µm, about 8 µm, about 9 µm, about 10 µm, about 15 µm, about 20 µm, about 25 µm, about 30 µm, about 35 µm, about 40 µm, about 45 µm, about 50 µm, about 60 µm, about 70 µm, about 80 µm, about 90 µm, about 100 µm, about 150 µm, about 200 µm, about 250 µm, about 300 µm, about 350 µm, about 400 µm, about 450 µm, about 500 µm, and all values and subranges therebetween. In some embodiments, an average length of the infused carbon nanotubes is less than about 1 µm, including about 0.5 µm, for example, and all values and subranges therebetween. In some embodiments, an average length of the infused carbon nanotubes is between about 1 µm and about 10 µm, including, for example, about 1 µm, about 2 µm, about 3 µm, about 4 µm, about 5 µm, about 6 µm, about 7 µm, about 8 µm, about 9 µm, about 10 µm, and all values and subranges therebetween. In still other embodiments, an average length of the infused carbon nanotubes is greater than about 500 µm, including, for example, about 510 µm, about 520 µm, about 550 µm, about 600 µm, about 700 µm, and all values and subranges therebetween. In various embodiments, the average length of the infused carbon nanotubes can be influenced, for example, by the exposure time to carbon nanotube growth conditions, the growth temperature, and flow rates and pressures of carbon-containing feedstock gas (e.g., acetylene, ethylene and/or ethanol) and carrier gases (e.g., helium, argon, and/or nitrogen) used during carbon nanotube synthesis. In general, during carbon nanotube synthesis, the carbon-containing feedstock gas is provided in a range of about 0.1% to about 15% of the total reaction volume.

In some embodiments, the average length of the infused carbon nanotubes is between about 1 µm and about 10 µm. Carbon nanotubes having such lengths can be useful, for example, in applications to increase shear strength. In other embodiments, an average length of the infused carbon nanotubes is between about 5 µm and about 70 µm. Carbon nanotubes having such lengths can be useful in applications including, for example, increased tensile strength, particularly if the carbon nanotubes are aligned with the fiber direction. In still other embodiments, an average length of the carbon nanotubes is between about 10 µm and about 100 µm. Carbon nanotubes having such lengths can be useful, for example, to improve electrical and thermal conductivity properties, in addition to mechanical properties. In some embodiments, an average length of the carbon nanotubes is between about 100 µm and about 500 µm. Carbon nanotubes having such lengths can be particularly beneficial to improve electrical and thermal conductivity properties, for example.

In some embodiments, an average length of the carbon nanotubes is sufficient to decrease the coefficient of thermal expansion of the composite material by about 4-fold or greater relative to a composite material lacking carbon nanotubes. In some embodiments, an average length of the carbon nanotubes is sufficient to improve the stiffness and wear resistance of the composite material by about 3-fold or greater relative to a composite material lacking carbon nanotubes. In some embodiments, an average length of the carbon nanotubes is sufficient to establish an electrically conductive pathway in the composite material. In some embodiments, an average length of the carbon nanotubes is sufficient to establish a thermally conductive pathway in the composite material.

In some embodiments, the carbon nanotubes infused to the fiber material are generally uniform in density distribution, referring to the uniformity of the carbon nanotube density on the fiber material. As defined above, the tolerance for a uniform density distribution is plus or minus about 10% over the fiber material surface area that is infused with carbon nanotubes. By way of non-limiting example, this tolerance is equivalent to about ±1500 carbon nanotubes/µm$^2$ for a carbon nanotube having a diameter of 8 nm and 5 walls. Such a figure assumes that the space inside the carbon nanotube is fillable.

In some embodiments, the maximum carbon nanotube density, expressed as a percent coverage of the fiber material (i.e., the percentage of the fiber material surface area that is covered with carbon nanotubes) can be as high as about 55%, again assuming a carbon nanotube having an 8 nm diameter, 5 walls and fillable space within. 55% surface area coverage is equivalent to about 15,000 carbon nanotubes/$\mu m^2$ for a carbon nanotube having the referenced dimensions. In some embodiments, the density of coverage is up to about 15,000 carbon nanotubes/$\mu m^2$. One of ordinary skill in the art will recognize that a wide range of carbon nanotube densities can be attained by varying the disposition of the catalytic nanoparticles on the surface of the fiber material, the exposure time to carbon nanotube growth conditions, and the actual growth conditions themselves used to infuse the carbon nanotubes to the fiber material. As noted above, shorter carbon nanotubes with higher distribution densities are generally more useful for improving mechanical properties (e.g., tensile strength), while longer carbon nanotubes with lower distribution densities are generally more useful for improving thermal and electrical properties. However, increased distribution densities can still be favorable even when longer carbon nanotubes are present.

Tensile strength can involve three different measurements: 1) Yield strength, which evaluates the stress at which material strain changes from elastic deformation to plastic deformation, resulting in permanent deformation; 2) Ultimate strength, which evaluates the maximum stress a material can withstand when subjected to tension, compression or shearing; and 3) Breaking strength, which evaluates the stress coordinate on a stress-strain curve at the point of rupture. Shear strength evaluates the stress at which a material fails when a load is applied perpendicular to the fiber direction. Compression strength evaluates the stress at which a material fails when a compressive load is applied (i.e., a load applied parallel to the fiber direction).

Multi-wall carbon nanotubes, in particular, have the highest tensile strength of any material yet measured, with a tensile strength of approximately 63 GPa having been achieved. Moreover, theoretical calculations have indicated a possible tensile strength of up to about 300 GPa for certain carbon nanotubes. As described above, the increase in tensile strength in the present composite materials depends upon the exact nature of the carbon nanotubes, as well as their density and distribution when infused on the fiber material. For example, carbon nanotube-infused fiber materials can exhibit a two to three-times or greater increase in tensile strength relative to the parent fiber material. Likewise, illustrative carbon nanotube-infused fiber materials can have up to three times or greater the shear strength of the parent fiber material and up to 2.5 times or greater the compression strength. Such increases in the strength of the fiber material are conveyed to the composite material in which the carbon nanotube-infused fiber material is distributed.

In some embodiments, the fiber material containing infused carbon nanotubes is distributed uniformly in the ceramic matrix. Stated another way, the carbon nanotube-infused fiber material is distributed homogenously in the ceramic matrix. In some embodiments, the fiber material is oriented randomly in the ceramic matrix. In such cases, the properties of the composite material are isotropically enhanced. In other embodiments, the fiber material is aligned or otherwise oriented in the ceramic matrix. In such cases, the properties of the composite material are anisotropically enhanced. In some embodiments, the fiber material is both distributed uniformly in the ceramic matrix and aligned. In other embodiments, the fiber material is distributed uniformly in the ceramic matrix in a random manner.

In some embodiments, the fiber material has two or more different lengths of carbon nanotubes infused thereon. In such embodiments, the distribution of the fiber material can again be random, aligned, or otherwise oriented in some manner. As noted above, carbon nanotubes of varying lengths can be infused to different sections of the same fiber material and used to convey different property enhancements to the composite material.

In alternative embodiments, carbon nanotubes having different lengths can be infused to two or more different fiber materials, each of which is then distributed uniformly in the composite material. Such fiber materials can again convey different property enhancements to the composite material. Accordingly, carbon nanotubes having a first length can be infused to a first fiber material and carbon nanotubes having a second length can be infused to a second fiber material to convey different property enhancements to a composite material. When two or more different fiber materials are used, distribution can again be random, aligned, or otherwise oriented in some manner. As discussed hereinbelow, distribution can also be in a non-uniform manner for one or two or more fiber materials containing carbon nanotubes infused thereon.

In other embodiments, the fiber material is distributed non-uniformly in the ceramic matrix. Stated another way, the carbon nanotube-infused fiber material can be distributed heterogeneously in the ceramic matrix. In some embodiments, the non-uniform distribution is a gradient distribution in the ceramic matrix. In some embodiments, a first portion of the ceramic matrix contains the carbon nanotube-infused fiber material and a second portion of the ceramic matrix contains none of the carbon nanotube-infused fiber material. As a non-limiting example of the latter embodiments, a ceramic matrix composite of the present disclosure may be selectively enhanced on its outermost regions by only including a fiber material near the ceramic matrix surface.

In embodiments containing non-uniformly distributed carbon nanotube-infused fiber materials, the carbon nanotube-infused fiber materials can be used to selectively convey enhanced properties only to certain portions of the composite material. By way of non-limiting example, a composite material having a carbon nanotube-infused fiber material only near its surface can be used to enhance surface heat transfer properties or to convey surface impact resistance. In alternative embodiments, carbon nanotubes having different lengths can be infused to two or more different fiber materials, which are then distributed non-uniformly in the composite material. For example, the fiber materials having different lengths of carbon nanotubes infused thereon may be distributed in different portions of the composite material. In such embodiments, the carbon nanotubes having different lengths differentially enhance the portions of the composite material in which they are distributed. By way of non-limiting example, carbon nanotubes having a length sufficient to improve impact resistance can be infused to a fiber material and distributed near the surface of the composite material, and carbon nanotubes having a length sufficient to establish an electrically conductive percolation pathway can be infused to a fiber material and distributed in another region of the composite material. Other combinations of property enhancements can be envisioned by those of ordinary skill in the art, in light of the present disclosure. As is the case when the carbon nanotube-infused fiber materials are uniformly distributed in the composite material, the disposition of the fiber materials can again be random, aligned, or otherwise oriented in some manner in the case of a non-uniform distribution.

In some embodiments, the composite materials include a ceramic matrix, a first portion of a carbon nanotube-infused fiber material and a second portion of a carbon nanotube-infused fiber material. The first portion of a carbon nanotube-infused fiber material and the second portion of a carbon nanotube-infused fiber material are distributed in a first region and a second region of the ceramic matrix, respectively. An average length of the carbon nanotubes infused to the first portion and an average length of the carbon nanotubes infused to the second portion are chosen such that the first region of the ceramic matrix and the second region of the ceramic matrix have different mechanical, electrical or thermal properties.

In some embodiments, the first portion of the carbon nanotube-infused fiber material and the second portion of the carbon nanotube-infused fiber material are the same fiber material. For example, in some embodiments, the first portion of the fiber material and the second portion of the fiber material are both carbon fibers or any other fiber material described herein. In other embodiments, the first portion of the carbon nanotube-infused fiber material and the second portion of the carbon nanotube-infused fiber material are different fiber materials. In some embodiments, at least one of the first portion of the carbon nanotube-infused fiber material and the second portion of the carbon nanotube-infused fiber material also include a passivation layer overcoating at least the carbon nanotube-infused fiber material. Further details of such passivation layers are considered in greater detail hereinbelow.

A wide variety of ceramic matrices can be used in forming the composite materials described herein. In some embodiments, the ceramic matrices are binary, ternary or quaternary ceramic materials. In some embodiments, the ceramic matrices are carbides, nitrides, borides or oxides. In some embodiments, the ceramic matrices include at least one compound such as, for example, silicon carbide, tungsten carbide, chromium carbide ($Cr_3C_2$), titanium carbide (TiC), titanium nitride (TiN), titanium boride (TiB2), aluminum oxide, and silicone nitride ($Si_3N_4$). In additional embodiments, other suitable ceramic matrices can include, for example, SiCN, $Fe_2N$, and $BaTiO_3$. In still additional embodiments, ceramic matrices can include lithium aluminosilicate or mullite (a silicate mineral having two stoichiometric forms: $3Al_2O_3.2SiO_2$ or $2Al_2O_3.SiO_2$)

After formation of the carbon nanotube-infused fiber materials, composite materials containing a ceramic matrix and the carbon nanotube-infused fiber materials can be formed using any method known to those of ordinary skill in the art including, for example, chemical vapor infiltration, reactive melt infiltration, electrophoretic deposition, polymer impregnation and pyrolysis, sintering, colloidal deposition, sol-gel deposition, and powder processing.

Figure 4:
FIGS. 4 and 5 show illustrative SEM images of carbon nanotube-infused carbon fibers distributed in silicon carbide ceramic matrices.
Figure 5:
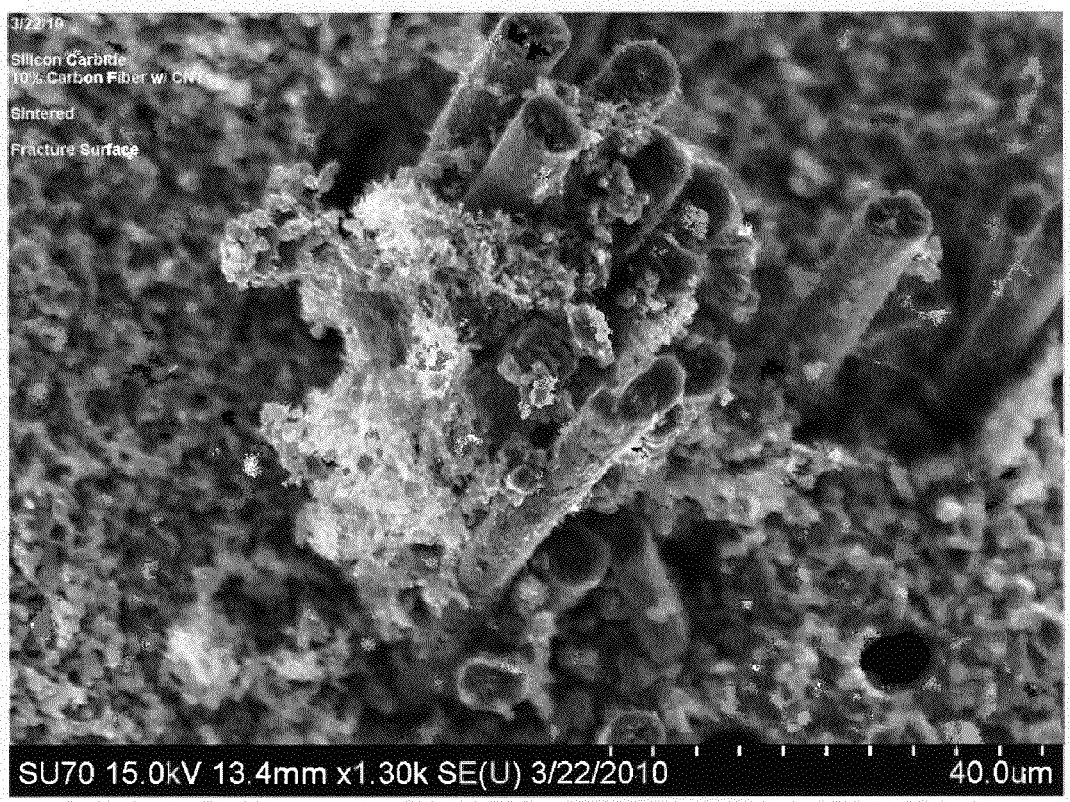

Certain combinations of ceramic matrices and carbon nanotube-infused fiber materials are contemplated by the present inventors to have particular utility in the art. In some embodiments, the fiber material is silicon carbide fibers and the ceramic matrix is aluminum oxide. In other embodiments, the fiber material is silicon carbide fibers and the ceramic matrix is silicon nitride. In still other embodiments, the fiber material is silicon carbide fibers and the ceramic matrix is silicon carbide. In still other embodiments, the fiber material is carbon fibers and the ceramic matrix is silicon carbide. FIGS. 4 and 5 show illustrative SEM images of carbon nanotube-infused carbon fibers distributed in silicon carbide ceramic matrices. The silicon carbide particles of FIG. 4 were fully sintered, while those of FIG. 5 were only partially sintered.

In some embodiments, the ceramic matrix is a cement. Illustrative cements are known to those of ordinary skill in the art and include, for example, Portland cement, Pozzolan-lime cement, slag-lime cement, supersulfated cement, calcium aluminate cement, calcium sulfoaluminate cement, and combinations thereof. In some embodiments, cements useful as ceramic matrices include carbide-based cements (e.g., tungsten carbide, chromium carbide, and titanium carbide cements), refractory cements (e.g., tungsten-thoria and barium-carbonate-nickel cements), chromium-alumina cements and nickel-magnesia iron-zirconium carbide cements, and combinations thereof.

In more specific embodiments, the ceramic matrix is Portland cement. Portland cement can be characterized by five classifications: Type I, Type II, Type III, Type IV and Type V. The particular mechanical properties and curing behavior of the Portland cement define the classification to which the cement is assigned. In some embodiments, the Portland cement is a Type I, Type II, Type III, Type IV or Type V Portland cement. Any of the various types of Portland cement can be used as a ceramic matrix in the various embodiments described herein.

One of ordinary skill in the art will recognize that composite materials typically employ about 60% fiber material and about 40% matrix material. With the introduction of a third element, such as the infused carbon nanotubes, these ratios can be altered. For example, with the addition of up to about 25% carbon nanotubes by weight, the fiber material can vary between about 5% and about 75% by weight, and the ceramic matrix material can vary between about 25% and about 95% by weight. As noted above, the carbon nanotube loading percentage can be varied in order to achieve a desired type of property enhancement. The carbon nanotube loading percentage can be varied, for example, by altering the density of carbon nanotubes infused to the fiber material, altering the amount of the fiber material, and/or altering the length of the carbon nanotubes infused to the fiber material.

In some embodiments; a weight percentage of the carbon nanotubes of the fiber material is determined by an average length of the carbon nanotubes. In some or other embodiments, a weight percentage of the carbon nanotubes of the fiber material is further determined by a density of coverage of carbon nanotubes infused to the fiber material. In illustrative embodiments, carbon nanotube loadings of less than about 5% by weight can be sufficient for mechanical property enhancements, whereas for electrical and thermal conductivity enhancements, carbon nanotube loadings greater than about 5% by weight are more desirable. In some embodiments, the composite materials described herein contain up to about 10% carbon nanotubes by weight. In some embodiments, the carbon nanotubes are between about 0.1 and about 10% of the composite material by weight. In some embodiments, the fiber materials contain up to about 40% of carbon nanotubes by weight. In some embodiments, the carbon nanotubes are between about 0.5 and about 40% of the carbon nanotube-infused fiber material by weight. In view of the foregoing, the present composite materials can vary widely in composition while still residing within the spirit and scope of the disclosure presented herein.

Depending on the application, the present composite materials can be formed using fiber materials either in the form of continuous fibers, chopped fibers or a combination thereof. In some embodiments, the fiber material is in a form of continuous fibers or chopped fibers. In some embodiments, the fiber material is in a form of chopped fibers. In the case of chopped fibers, a continuous fiber can be infused with carbon nanotubes as described herein and in applicants' co-pending patent applications and then cut into smaller segments according to methods known to those of ordinary skill in the art. In some embodiments, continuous fibers can be directly distributed in the composite materials, either individually or in any of the arrangements of woven or non-woven fibers referenced hereinabove. In some embodiments, the fiber materials are of spoolable dimensions.

In some embodiments, the present composite materials also include a passivation layer overcoating at least the carbon nanotube-infused fiber material. In some embodiments, the passivation layer also overcoats the carbon nanotubes infused on the fiber material. Under the conditions used for forming the composite materials, the fiber material and/or the carbon nanotubes infused thereon can become reactive with the ceramic matrix or the precursor(s) used for forming the ceramic matrix. For example, in the process of forming a composite material with a ceramic matrix and a carbon nanotube-infused fiber material, some of the fiber material and/or carbon nanotubes infused thereon can react to form an undesirable byproduct in the ceramic matrix that can structurally weaken or otherwise degrade the properties of the composite material. Incorporation of a passivation layer on the carbon nanotube-infused fiber material eliminates or substantially reduces undesirable reactions of the fiber material or the carbon nanotubes.

A number of different passivation layers and methods for deposition thereof are suitable for overcoating the carbon nanotube-infused fiber materials described herein. In some embodiments, illustrative passivation layers can include, for example, nickel and titanium diboride. Alternative passivation layers that also can be suitable include, for example, chromium, magnesium, titanium, silver and tin. In some embodiments, the passivation layer is deposited on the carbon nanotube-infused fiber material through a technique such as, for example, electroplating or chemical vapor deposition. For example, the passivation layer can be electroless nickel or a nickel alloy deposited by an electroplating technique. In some embodiments, the passivation layer has a thickness of about 1 nm to about 10 μm.

Although a carbon nanotube-infused fiber material can become reactive with the ceramic matrix during formation of the composite material and such a reaction is generally thought to be undesirable, in some embodiments, such a reaction can be used to beneficially enhance the properties of the composite material. In such embodiments, at least one of the fiber material or the carbon nanotubes infused thereon at least partially react with a ceramic precursor material to form at least a portion of the ceramic matrix. Reaction of the fiber material or the carbon nanotubes with a ceramic precursor material can be desirable when formation of voids within the composite material is undesirable. As a non-limiting example, a composite material containing a silicon carbide ceramic matrix and carbon fibers distributed therein can be formed by applying liquid silicon to carbon nanotube-infused carbon fibers, which results in formation of silicon carbide in situ using the carbon fibers or carbon nanotubes infused thereon as a carbon source. Other examples of in situ formation of the ceramic matrix can be envisioned by those of ordinary skill in the art.

In some embodiments, the infusion of carbon nanotubes to the fiber material can serve further purposes including, for example, as a sizing agent to protect the fiber material from moisture, oxidation, abrasion and/or compression. A carbon nanotube-based sizing agent can also serve as an interface between the fiber material and the ceramic matrix in a composite material. Such a carbon nanotube-based sizing agent can be applied to a fiber material in lieu of or in addition to conventional sizing agents. Conventional sizing agents vary widely in type and function and include, for example, surfactants, anti-static agents, lubricants, siloxanes, alkoxysilanes, aminosilanes, silanes, silanols, polyvinyl alcohol, starch, and mixtures thereof. When present, such conventional sizing agents can protect the carbon nanotubes themselves and/or provide further property enhancements to the fiber materials that are not conveyed by the carbon nanotubes alone. In some embodiments, a conventional sizing agent can be removed from the fiber material prior to infusion with the carbon nanotubes. As noted above, carbon nanotubes infused to a fiber material can be directly bonded to the fiber material or indirectly bonded through a catalytic nanoparticle or barrier coating, which can be a conventional sizing agent in some embodiments.

Composite materials containing ceramic matrices and carbon nanotube-infused fiber materials have a number of potential uses. In some embodiments, articles containing composite materials containing a ceramic matrix and a carbon nanotube-infused fiber material are described herein.

Additionally, carbon nanotube-infused conductive carbon fibers can be used in the manufacture of electrodes for superconductors. In the production of superconducting fibers, it can be challenging to achieve adequate adhesion of the superconducting layer to a fiber material due, at least in part, to the different coefficients of thermal expansion of the fiber material and of the superconducting layer. Another difficulty in the art arises during the coating of the fiber material by a CVD process. For example, reactive gases (e.g., hydrogen gas or ammonia), can attack the fiber surface and/or form undesired hydrocarbon compounds on the fiber surface and make good adhesion of the superconducting layer more difficult. Carbon nanotube-infused carbon fiber materials can overcome these aforementioned challenges in the art.

As noted above, composite materials having carbon nanotube-infused fiber materials can display improved wear resistance due to the presence of the carbon nanotubes. Articles that can benefit from the presence of composite materials containing a metal matrix and carbon nanotube-infused fiber materials include, without limitation, brake rotors, automobile drive shafts, rubber o-rings and gasket seals, tools, bearings, aircraft parts, and bicycle frames.

The large effective surface area of carbon nanotubes makes the present composite materials suitable for water filtration applications and other extractive processes, such as, for example, separation of organic oils from water. Composite materials containing carbon nanotube-infused fiber materials can also be used to remove organic toxins from water tables, water storage facilities, or in-line filters for home and office use.

In oilfield technologies, the present composite materials are useful in the manufacture of drilling equipment including, for example, pipe bearings, piping reinforcement, and rubber o-rings. Furthermore, as described above, carbon nanotube-infused fibers can be used in extractive processes that are also applicable to the oilfield to obtain valuable petroleum deposits from a geological formation. For example, the present composite materials can be used to extract oil from formations where substantial water and/or sand is present or to extract heavier oils that would otherwise be difficult to isolate due to their high boiling points. In conjunction with a perforated piping system, for example, the wicking of such heavy oils by the present composite materials overcoated on the perforated piping can be operatively coupled to a vacuum system, or the like, to continuously remove high boiling fractions from heavy oil and oil shale formations. Moreover, such processes can be used in conjunction with, or in lieu of, conventional thermal or catalyzed cracking methods that are known in the art.

The present composite materials can also enhance structural elements in aerospace and ballistics applications. For example, structures including nose cones in missiles, leading edges of aircraft wings, primary aircraft structural parts (e.g., flaps, aerofoils, propellers and air brakes, small plane fuselages, helicopter shells and rotor blades), secondary aircraft structural parts (e.g., floors, doors, seats, air conditioners, and secondary tanks) and aircraft motor parts can benefit from the structural enhancement provided by the present composite materials containing carbon nanotube-infused fiber materials. Structural enhancement in many other applications can include, for example, mine sweeper hulls, helmets, radomes, rocket nozzles, rescue stretchers, and engine components. In building and construction, structural enhancement of exterior features includes, for example, columns, pediments, domes, cornices, and formwork. Likewise, interior building enhancement includes structures such as, for example, blinds, sanitary-ware, window profiles, and the like.

In the maritime industry, structural enhancement can include boat hulls, stringers, masts, propellers, rudders and decks. The present composite materials can also be used in the heavy transportation industry in large panels for trailer walls, floor panels for railcars, truck cabs, exterior body molding, bus body shells, and cargo containers, for example. In automotive applications, composite materials can be used in interior parts (e.g., trimming, seats, and instrument panels), exterior structures (e.g., body panels, openings, underbody, and front and rear modules), and automotive engine compartment and fuel mechanical area parts (e.g., axles and suspensions, fuel and exhaust systems, and electrical and electronic components).

Other applications of present composite materials include, for example, bridge construction, reinforced concrete products (e.g., dowel bars, reinforcing bars, post-tensioning and pre-stressing tendons), stay-in-place framework, electric power transmission and distribution structures (e.g., utility poles, transmission poles, and cross-arms), highway safety and roadside features (e.g., sign supports, guardrails, posts and supports), noise barriers, municipal pipes and storage tanks.

The present composite materials can also be used in a variety of leisure equipment such as water and snow skis, bicycles, kayaks, canoes and paddles, snowboards, golf club shafts, golf trolleys, fishing rods, and swimming pools. Other consumer goods and business equipment include gears, pans, housings, gas pressure bottles and components for household appliances (e.g., washers, washing machine drums, dryers, waste disposal units, air conditioners and humidifiers).

The electrical properties of carbon nanotube-infused fiber materials also can impact various energy and electrical applications. For example, the present composite materials can be used in wind turbine blades, solar structures, and electronic enclosures (e.g., laptops, cell phones, and computer cabinets, where the infused carbon nanotubes can be used to provide EMI shielding). Other applications include powerlines, cooling devices, light poles, circuit boards, electrical junction boxes, ladder rails, optical fiber, power built into structures such as data lines, computer terminal housings, and business equipment (e.g., copiers, cash registers and mailing equipment).

In other various embodiments, methods for making composite materials containing a ceramic matrix and a carbon nanotube-infused fiber material are described herein. In some embodiments, the methods include providing a carbon nanotube-infused fiber material, distributing the carbon nanotube-infused fiber material in a green ceramic precursor, and curing the green ceramic precursor to form a composite material containing a ceramic matrix and a carbon nanotube-infused fiber material.

In some embodiments, the methods further include densifying the composite material. Illustrative densification methods are known to those of ordinary skill in the art and include, for example, compressing, sintering and current-activated pressure assisted densification. Densification can be particularly beneficial for armor applications of the present composite materials in order to improve their impact resistance. In some embodiments, at least a portion of the fiber material and/or the carbon nanotubes react with the green ceramic precursor to form the ceramic matrix. In such embodiments, beneficial densification can be realized over a composite material made without in situ formation of the ceramic matrix.

In some embodiments of the methods, the carbon nanotube-infused fiber material is uniformly distributed in the ceramic matrix. In other embodiments, the carbon nanotube-infused fiber material is non-uniformly distributed in the ceramic matrix. In some embodiments, a non-uniform distribution can be a gradient distribution.

In some embodiments of the methods, the ceramic matrix includes at least one ceramic compound selected silicon carbide, tungsten carbide, chromium carbide, titanium carbide, titanium nitride, titanium boride, aluminum oxide, silicone nitride, Mullite, SiCN, Fe2N, and $BaTiO_3$. In some embodiments, the fiber material includes, for example, glass fibers, carbon fibers, metal fibers, ceramic fibers, organic fibers, silicon carbide fibers, boron carbide fibers, silicon nitride fibers, aluminum oxide fibers and combinations thereof. In some embodiments, the fiber material is chopped fibers. In some embodiments, the fiber material is a continuous fiber material.

In some embodiments, the methods further include overcoating at least a portion of the carbon nanotube-infused fiber material with a passivation layer. In some embodiments, the carbon nanotubes are also overcoated with the passivation layer. In some embodiments, the passivation layer can be deposited by a technique such as, for example, electroplating or chemical vapor deposition. Illustrative passivation layers include, for example, nickel, titanium diboride, chromium, magnesium, titanium, silver and tin.

In still other embodiments, methods for making composite materials containing a cement ceramic matrix and a carbon nanotube-infused fiber material are described herein. The methods include providing a cement ceramic matrix, providing a carbon nanotube-infused fiber material, distributing the carbon nanotube-infused fiber material in the cement, and curing the cement to form a concrete containing the carbon nanotube-infused fiber material. In some embodiments, the carbon nanotube-infused fiber material is a chopped fiber material. In some embodiments, the methods include adding water to the cement and then dehydrating the cement during curing to form concrete.

In some embodiments, the concrete containing a carbon nanotube-infused fiber material can further include any other components typically used in concrete. Illustrative additional components include, for example, fine and crushed aggregates (e.g., crushed stone, sand, shells, and natural gravel), reinforcement material for carrying tensile loads (e.g., steel reinforcement bars, glass fibers, steel fibers, and plastic fibers), and chemical admixtures (e.g., accelerators, retarders, plasticizers, air entrainments, pigments and corrosion inhibitors).

Embodiments disclosed herein provide carbon nanotube-infused fibers that are readily prepared by methods described in U.S. patent application Ser. Nos. 12/611,073, 12/611,101 and 12/611,103, each of which is incorporated by reference herein in its entirety.

To infuse carbon nanotubes to a fiber material, the carbon nanotubes are synthesized directly on the fiber material. In some embodiments, this is accomplished by first disposing a carbon nanotube-forming catalyst on the fiber material. A number of preparatory processes can be performed prior to this catalyst deposition.

In some embodiments, the fiber material can be optionally treated with plasma to prepare the surface to accept the catalyst. For example, a plasma treated glass fiber material can provide a roughened glass fiber surface in which the carbon nanotube-forming catalyst can be deposited. In some embodiments, the plasma also serves to "clean" the fiber surface. The plasma process for "roughing" the fiber surface thus facilitates catalyst deposition. The roughness is typically on the scale of nanometers. In the plasma treatment process craters or depressions are formed that are nanometers deep and nanometers in diameter. Such surface modification can be achieved using a plasma of any one or more of a variety of different gases, including, without limitation, argon, helium, oxygen, ammonia, nitrogen and hydrogen.

In some embodiments, where a fiber material being employed has a sizing material associated with it, such sizing can be optionally removed prior to catalyst deposition. Optionally, the sizing material can be removed after catalyst deposition. In some embodiments, sizing material removal can be accomplished during carbon nanotube synthesis or just prior to carbon nanotube synthesis in a pre-heat step. In other embodiments, some sizing agents can remain throughout the entire carbon nanotube synthesis process.

Yet another optional step prior to or concomitant with deposition of the carbon nanotube-forming catalyst is application of a barrier coating to the fiber material. Barrier coatings are materials designed to protect the integrity of sensitive fiber materials, such as carbon fiber, organic fibers, metal fibers, and the like. Such a barrier coating can include for example an alkoxysilane, an alumoxane, alumina nanoparticles, spin on glass and glass nanoparticles. The carbon nanotube-forming catalyst can be added to the uncured barrier coating material and then applied to the fiber material together, in one embodiment. In other embodiments the barrier coating material can be added to the fiber material prior to deposition of the carbon nanotube-forming catalyst. In such embodiments, the barrier coating can be partially cured prior to catalyst deposition. The barrier coating material can be of a sufficiently thin thickness to allow exposure of the carbon nanotube-forming catalyst to the carbon feedstock gas for subsequent CVD growth. In some embodiments, the barrier coating thickness is less than or about equal to the effective diameter of the carbon nanotube-forming catalyst. Once the carbon nanotube-forming catalyst and the barrier coating are in place, the barrier coating can be fully cured. In some embodiments, the thickness of the barrier coating can be greater than the effective diameter of the carbon nanotube-forming catalyst so long as it still permits access of carbon nanotube feedstock gases to the site of the catalysts. Such barrier coatings can be sufficiently porous to allow access of carbon feedstock gases to the carbon nanotube-forming catalyst.

Without being bound by theory, the barrier coating can serve as an intermediate layer between the fiber material and the carbon nanotubes and can also assist in mechanically infusing the carbon nanotubes to the fiber material. Such mechanical infusion provides a robust system in which the fiber material still serves as a platform for organizing the carbon nanotubes and the benefits of mechanical infusion with a barrier coating are similar to the indirect type fusion described hereinabove. Moreover, the benefit of including a barrier coating is the immediate protection it provides the fiber material from chemical damage due to exposure to moisture and/or any thermal damage due to heating of the fiber material at the temperatures used to promote carbon nanotube growth.

As described further below, the carbon nanotube-forming catalyst can be prepared as a liquid solution that contains the carbon nanotube-forming catalyst as transition metal nanoparticles. The diameters of the synthesized carbon nanotubes are related to the size of the transition metal nanoparticles as described above.

Carbon nanotube synthesis can be based on a chemical vapor deposition (CVD) process which occurs at elevated temperatures. The specific temperature is a function of catalyst choice, but can typically be in a range of about 500° C. to about 1000° C. Accordingly, carbon nanotube synthesis involves heating the fiber material to a temperature in the aforementioned range to support carbon nanotube growth.

CVD-promoted carbon nanotube growth on the catalyst-laden fiber material is then performed. The CVD process can be promoted by, for example, a carbon-containing feedstock gas such as acetylene, ethylene, and/or ethanol. The carbon nanotube synthesis processes generally use an inert gas (nitrogen, argon, and/or helium) as a primary carrier gas. The carbon-containing feedstock gas is typically provided in a range from between about 0% to about 15% of the total mixture. A substantially inert environment for CVD growth can be prepared by removal of moisture and oxygen from the growth chamber.

In the carbon nanotube synthesis process, carbon nanotubes grow at the sites of a transition metal catalytic nanoparticle that is operable for carbon nanotube growth. The presence of a strong plasma-creating electric field can be optionally employed to affect carbon nanotube growth. That is, the growth tends to follow the direction of the electric field. By properly adjusting the geometry of the plasma spray and electric field, vertically-aligned carbon nanotubes (i.e., perpendicular to the longitudinal axis of the fiber material) can be synthesized. Under certain conditions, even in the absence of a plasma, closely-spaced carbon nanotubes can maintain a substantially vertical growth direction resulting in a dense array of carbon nanotubes resembling a carpet or forest.

The operation of disposing catalytic nanoparticles on the fiber material can be accomplished by spraying or dip coating a solution or by gas phase deposition via, for example, a plasma process. Thus, in some embodiments, after forming a catalyst solution in a solvent, the catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with catalytic nanoparticles that are operable for formation of carbon nanotubes. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of carbon nanotube-forming catalyst for between about 3 seconds to about 90 seconds depending on the dip configuration and linespeed. Employing spraying or dip coating processes, a fiber material with a catalyst surface density of less than about 5% surface coverage to as high as about 80% surface coverage can be obtained. At higher surface densities (e.g., about 80%), the carbon nanotube-forming catalyst nanoparticles are nearly a monolayer. In some embodiments, the process of coating the carbon nanotube-forming catalyst on the fiber material produces no more than a monolayer. For example, carbon nanotube growth on a stack of carbon nanotube-forming catalyst can erode the degree of infusion of the carbon nanotubes to the fiber material. In other embodiments, transition metal catalytic nanoparticles can be deposited on the fiber material using evaporation techniques, electrolytic deposition techniques, and other processes known to those skilled in the art, such as addition of the transition metal catalyst to a plasma feedstock gas as a metal organic, metal salt or other composition promoting gas phase transport.

Because processes to manufacture carbon nanotube-infused fibers are designed to be continuous, a spoolable fiber material can be dip-coated in a series of baths where dip coating baths are spatially separated. In a continuous process in which nascent fibers are being generated de novo, such as newly formed glass fibers from a furnace, dip bath or spraying of a carbon nanotube-forming catalyst can be the first step after sufficiently cooling the newly formed fiber material. In some embodiments, cooling of newly formed glass fibers can be accomplished with a cooling jet of water which has the carbon nanotube-forming catalyst particles dispersed therein.

In some embodiments, application of a carbon nanotube-forming catalyst can be performed in lieu of application of a sizing when generating a fiber and infusing it with carbon nanotubes in a continuous process. In other embodiments, the carbon nanotube-forming catalyst can be applied to newly formed fiber materials in the presence of other sizing agents. Such simultaneous application of a carbon nanotube-forming catalyst and other sizing agents can provide the carbon nanotube-forming catalyst in surface contact with the fiber material to insure carbon nanotube infusion. In yet further embodiments, the carbon nanotube-forming catalyst can be applied to nascent fibers by spray or dip coating while the fiber material is in a sufficiently softened state, for example, near or below the annealing temperature, such that the carbon nanotube-forming catalyst is slightly embedded in the surface of the fiber material. When depositing the carbon nanotube-forming catalyst on hot glass fiber materials, for example, care should be given to not exceed the melting point of the carbon nanotube-forming catalyst, thereby causing nanoparticle fusion and loss of control of the carbon nanotube characteristics (e.g., diameter) as a result.

The carbon nanotube-forming catalyst solution can be a transition metal nanoparticle solution of any d-block transition metal. In addition, the nanoparticles can include alloys and non-alloy mixtures of d-block metals in elemental form, in salt form, and mixtures thereof. Such salt forms include, without limitation, oxides, carbides, and nitrides, acetates, nitrates, and the like. Non-limiting illustrative transition metal nanoparticles include, for example, Ni, Fe, Co, Mo, Cu, Pt, Au, and Ag and salts thereof and mixtures thereof. In some embodiments, such carbon nanotube-forming catalysts are disposed on the fiber material by applying or infusing a carbon nanotube-forming catalyst directly to the fiber material. Many nanoparticle transition metal catalysts are readily commercially available from a variety of suppliers, including, for example, Ferrotec Corporation (Bedford, N.H.).

Catalyst solutions used for applying the carbon nanotube-forming catalyst to the fiber material can be in any common solvent that allows the carbon nanotube-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the carbon nanotube-forming catalytic nanoparticles. Concentrations of carbon nanotube-forming catalyst in the catalyst solution can be in a range from about 1:1 to about 1:10000 catalyst to solvent.

In some embodiments, after applying the carbon nanotube-forming catalyst to the fiber material, the fiber material can be optionally heated to a softening temperature. This step can aid in embedding the carbon nanotube-forming catalyst in the surface of the fiber material to encourage seeded growth and prevent tip growth where the catalyst floats at the tip of the leading edge a growing carbon nanotube. In some embodiments heating of the fiber material after disposing the carbon nanotube-forming catalyst on the fiber material can be at a temperature between about 500° C. and about 1000° C. Heating to such temperatures, which can be used for carbon nanotube growth, can serve to remove any pre-existing sizing agents on the fiber material allowing deposition of the carbon nanotube-forming catalyst directly on the fiber material. In some embodiments, the carbon nanotube-forming catalyst can also be placed on the surface of a sizing coating prior to heating. The heating step can be used to remove sizing material while leaving the carbon nanotube-forming catalyst disposed on the surface of the fiber material. Heating at these temperatures can be performed prior to or substantially simultaneously with introduction of a carbon-containing feedstock gas for carbon nanotube growth.

In some embodiments, the process of infusing carbon nanotubes to a fiber material includes removing sizing agents from the fiber material, applying a carbon nanotube-forming catalyst to the fiber material after sizing removal, heating the fiber material to at least about 500° C., and synthesizing carbon nanotubes on the fiber material. In some embodiments, operations of the carbon nanotube infusion process include removing sizing from a fiber material, applying a carbon nanotube-forming catalyst to the fiber material, heating the fiber material to a temperature operable for carbon nanotube synthesis and spraying a carbon plasma onto the catalyst-laden fiber material. Thus, where commercial fiber materials are employed, processes for constructing carbon nanotube-infused fibers can include a discrete step of removing sizing from the fiber material before disposing the catalyst on the fiber material. Some commercial sizing materials, if present, can prevent surface contact of the carbon nanotube-forming catalyst with the fiber material and inhibit carbon nanotube infusion to the fiber material. In some embodiments, where sizing removal is assured under carbon nanotube synthesis conditions, sizing removal can be performed after deposition of the carbon nanotube forming catalyst but just prior to or during providing a carbon-containing feedstock gas.

The step of synthesizing carbon nanotubes can include numerous techniques for forming carbon nanotubes, including, without limitation, micro-cavity, thermal or plasma-enhanced CVD techniques, laser ablation, arc discharge, and high pressure carbon monoxide (HiPCO). During CVD, in particular, a sized fiber material with carbon nanotube-forming catalyst disposed thereon, can be used directly. In some embodiments, any conventional sizing agents can be removed during carbon nanotube synthesis. In some embodiments other sizing agents are not removed, but do not hinder carbon nanotube synthesis and infusion to the fiber material due to the diffusion of the carbon-containing feedstock gas through the sizing. In some embodiments, acetylene gas is ionized to create a jet of cold carbon plasma for carbon nanotube synthesis. The plasma is directed toward the catalyst-laden fiber material. Thus, in some embodiments synthesizing carbon nanotubes on a fiber material includes (a) forming a carbon plasma; and (b) directing the carbon plasma onto the catalyst disposed on the fiber material. The diameters of the carbon nanotubes that are grown are dictated by the size of the carbon nanotube-forming catalyst. In some embodiments, a sized fiber material is heated to between about 550° C. and about 800° C. to facilitate carbon nanotube synthesis. To initiate the growth of carbon nanotubes, two or more gases are bled into the reactor: an inert carrier gas (e.g., argon, helium, or nitrogen) and a carbon-containing feedstock gas (e.g., acetylene, ethylene, ethanol or methane). Carbon nanotube grow at the sites of the carbon nanotube-forming catalyst.

In some embodiments, a CVD growth can be plasma-enhanced. A plasma can be generated by providing an electric field during the growth process. Carbon nanotubes grown under these conditions can follow the direction of the electric field. Thus, by adjusting the geometry of the reactor, vertically aligned carbon nanotubes can be grown where the carbon nanotubes are perpendicular to the longitudinal axis of the fiber material (i.e., radial growth). In some embodiments, a plasma is not required for radial growth to occur about the fiber material. For fiber materials that have distinct sides such as, for example, tapes, mats, fabrics, plies, and the like, the carbon nanotube-forming catalyst can be disposed on one or both sides of the fiber material. Correspondingly, under such conditions, carbon nanotubes can be grown on one or both sides of the fiber material as well.

As described above, the carbon nanotube synthesis is performed at a rate sufficient to provide a continuous process for infusing spoolable fiber materials with carbon nanotubes. Numerous apparatus configurations facilitate such a continuous synthesis as exemplified below.

In some embodiments, carbon nanotube-infused fiber materials can be prepared in an "all-plasma" process. In such embodiments, the fiber materials pass through numerous plasma-mediated steps to form the final carbon nanotube-infused fiber materials. The first of the plasma processes, can include a step of fiber surface modification. This is a plasma process for "roughing" the surface of the fiber material to facilitate catalyst deposition, as described above. As also described above, surface modification can be achieved using a plasma of any one or more of a variety of different gases, including, without limitation, argon, helium, oxygen, ammonia, hydrogen, and nitrogen.

After surface modification, the fiber material proceeds to catalyst application. In the present all plasma process, this step is a plasma process for depositing the carbon nanotube-forming catalyst on the fiber material. The carbon nanotube-forming catalyst is typically a transition metal as described above. The transition metal catalyst can be added to a plasma feedstock gas as a precursor in non-limiting forms including, for example, a ferrofluid, a metal organic, a metal salt, mixtures thereof or any other composition suitable for promoting gas phase transport. The carbon nanotube-forming catalyst can be applied at room temperature in ambient environment with neither vacuum nor an inert atmosphere being required. In some embodiments, the fiber material is cooled prior to catalyst application.

Continuing the all-plasma process, carbon nanotube synthesis occurs in a carbon nanotube-growth reactor. Carbon nanotube growth can be achieved through the use of plasma-enhanced chemical vapor deposition, wherein carbon plasma is sprayed onto the catalyst-laden fibers. Since carbon nanotube growth occurs at elevated temperatures (typically in a range of about 500° C. to about 1000° C. depending on the catalyst), the catalyst-laden fibers can be heated prior to being exposed to the carbon plasma. For the carbon nanotube infusion process, the fiber material can be optionally heated until softening occurs. After heating, the fiber material is ready to receive the carbon plasma. The carbon plasma is generated, for example, by passing a carbon-containing feedstock gas such as, for example; acetylene, ethylene, ethanol, and the like, through an electric field that is capable of ionizing the gas. This cold carbon plasma is directed, via spray nozzles, to the fiber material. The fiber material can be in close proximity to the spray nozzles, such as within about 1 centimeter of the spray nozzles, to receive the plasma. In some embodiments, heaters are disposed above the fiber material at the plasma sprayers to maintain the elevated temperature of the fiber material.

Another configuration for continuous carbon nanotube synthesis involves a special rectangular reactor for the synthesis and growth of carbon nanotubes directly on fiber materials. The reactor can be designed for use in a continuous in-line process for producing carbon nanotube-infused fiber materials. In some embodiments, carbon nanotubes are grown via a CVD process at atmospheric pressure and an elevated temperature in the range of about 550° C. and about 800° C. in a multi-zone reactor. The fact that the carbon nanotube synthesis occurs at atmospheric pressure is one factor that facilitates the incorporation of the reactor into a continuous processing line for carbon nanotube infusion to the fiber materials. Another advantage consistent with in-line continuous processing using such a zone reactor is that carbon nanotube growth occurs in seconds, as opposed to minutes (or longer), as in other procedures and apparatus configurations typical in the art.

Carbon nanotube synthesis reactors in accordance with the various embodiments include the following features:

Rectangular Configured Synthesis Reactors: The cross-section of a typical carbon nanotube synthesis reactor known in the art is circular. There are a number of reasons for this including, for example, historical reasons (e.g., cylindrical reactors are often used in laboratories) and convenience (e.g., flow dynamics are easy to model in cylindrical reactors, heater systems readily accept circular tubes (e.g., quartz, etc.), and ease of manufacturing. Departing from the cylindrical convention, the present disclosure provides a carbon nanotube synthesis reactor having a rectangular cross section. The reasons for the departure include at least the following:

1) Inefficient Use of Reactor Volume. Since many fiber materials that can be processed by the reactor are relatively planar (e.g., flat tapes, sheet-like forms, or spread tows or rovings), a circular cross-section is an inefficient use of the reactor volume. This inefficiency results in several drawbacks for cylindrical carbon nanotube synthesis reactors including, for example, a) maintaining a sufficient system purge; increased reactor volume requires increased gas flow rates to maintain the same level of gas purge, resulting in inefficiencies for high volume production of carbon nanotubes in an open environment; b) increased carbon-containing feedstock gas flow rates; the relative increase in inert gas flow for system purge, as per a) above, requires increased carbon-containing feedstock gas flow rates. Consider that the volume of an illustrative 12K glass fiber roving is 2000 times less than the total volume of a synthesis reactor having a rectangular cross-section. In an equivalent cylindrical reactor (i.e., a cylindrical reactor that has a width that accommodates the same planarized glass fiber material as the rectangular cross-section reactor), the volume of the glass fiber material is 17,500 times less than the volume of the reactor. Although gas deposition processes, such as CVD, are typically governed by pressure and temperature alone, volume can have a significant impact on the efficiency of deposition. With a rectangular reactor there is a still excess volume, and this excess volume facilitates unwanted reactions. However, a cylindrical reactor has about eight times that volume available for facilitating unwanted reactions. Due to this greater opportunity for competing reactions to occur, the desired reactions effectively occur more slowly in a cylindrical reactor. Such a slow down in carbon nanotube growth, is problematic for the development of continuous growth processes. Another benefit of a rectangular reactor configuration is that the reactor volume can be decreased further still by using a small height for the rectangular chamber to make the volume ratio better and the reactions even more efficient. In some embodiments disclosed herein, the total volume of a rectangular synthesis reactor is no more than about 3000 times greater than the total volume of a fiber material being passed through the synthesis reactor. In some further embodiments, the total volume of the rectangular synthesis reactor is no more than about 4000 times greater than the total volume of the fiber material being passed through the synthesis reactor. In some still further embodiments, the total volume of the rectangular synthesis reactor is less than about 10,000 times greater than the total volume of the fiber material being passed through the synthesis reactor. Additionally, it is notable that when using a cylindrical reactor, more carbon-containing feedstock gas is required to provide the same flow percent as compared to reactors having a rectangular cross section. It should be appreciated that in some other embodiments, the synthesis reactor has a cross-section that is described by polygonal forms that are not rectangular, but are relatively similar thereto and provide a similar reduction in reactor volume relative to a reactor having a circular cross section; and c) problematic temperature distribution; when a relatively small-diameter reactor is used, the temperature gradient from the center of the chamber to the walls thereof is minimal, but with increased reactor size, such as would be used for commercial-scale production, such temperature gradients increase. Temperature gradients result in product quality variations across the fiber material (i.e., product quality varies as a function of radial position). This problem is substantially avoided when using a reactor having a rectangular cross-section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided.

2) Gas introduction. Because tubular furnaces are normally employed in the art, typical carbon nanotube synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall carbon nanotube growth rate because the incoming feedstock gas is continuously replenishing at the hottest portion of the system, which is where carbon nanotube growth is most active.

Zoning. Chambers that provide a relatively cool purge zone extend from both ends of the rectangular synthesis reactor. Applicants have determined that if a hot gas were to mix with the external environment (i.e., outside of the rectangular reactor), there would be increased degradation of the fiber material. The cool purge zones provide a buffer between the internal system and external environments. Carbon nanotube synthesis reactor configurations known in the art typically require that the substrate is carefully (and slowly) cooled. The cool purge zone at the exit of the present rectangular carbon nanotube growth reactor achieves the cooling in a short period of time, as required for continuous in-line processing.

Non-contact, hot-walled, metallic reactor. In some embodiments, a metallic hot-walled reactor (e.g., stainless steel) is employed. Use of this type of reactor can appear counterintuitive because metal, and stainless steel in particular, is more susceptible to carbon deposition (i.e., soot and by-product formation). Thus, most carbon nanotube synthesis reactors are made from quartz because there is less carbon deposited, quartz is easier to clean, and quartz facilitates sample observation. However, Applicants have observed that the increased soot and carbon deposition on stainless steel results in more consistent, efficient, faster, and stable carbon nanotube growth. Without being bound by theory it has been indicated that, in conjunction with atmospheric operation, the CVD process occurring in the reactor is diffusion limited. That is, the carbon nanotube-forming catalyst is "overfed;" too much carbon is available in the reactor system due to its relatively higher partial pressure (than if the reactor was operating under partial vacuum). As a consequence, in an open system—especially a clean one—too much carbon can adhere to the particles of carbon nanotube-forming catalyst, compromising their ability to synthesize carbon nanotubes. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, react with the carbon nanotube-forming catalyst at a rate that does not poison the catalyst. Existing systems run "cleanly" which, if they were open for continuous processing, would produce a much lower yield of carbon nanotubes at reduced growth rates.

Although it is generally beneficial to perform carbon nanotube synthesis "dirty" as described above, certain portions of the apparatus (e.g., gas manifolds and inlets) can nonetheless negatively impact the carbon nanotube growth process when soot creates blockages. In order to combat this problem, such areas of the carbon nanotube growth reaction chamber can be protected with soot inhibiting coatings such as, for example, silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and Carbon Nanotube Synthesis. In the carbon nanotube synthesis reactor disclosed herein, both catalyst reduction and carbon nanotube growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present disclosure due, at least in part, to the fact that carbon-containing feedstock gas is introduced at the center of the reactor, not the end as would be typical in the art using cylindrical reactors. The reduction process occurs as the fiber material enters the heated zone. By this point, the gas has had time to react with the walls and cool off prior to reducing the catalyst (via hydrogen radical interactions). It is this transition region where the reduction occurs. At the hottest isothermal zone in the system, carbon nanotube growth occurs, with the greatest growth rate occurring proximal to the gas inlets near the center of the reactor.

In some embodiments, when loosely affiliated fiber materials including, for example, tows or rovings are employed (e.g., as glass roving), the continuous process can include steps that spread out the strands and/or filaments of the tow or roving. Thus, as a tow or roving is unspooled it can be spread using a vacuum-based fiber spreading system, for example. When employing sized glass fiber rovings, for example, which can be relatively stiff, additional heating can be employed in order to "soften" the roving to facilitate fiber spreading. The spread fibers which comprise individual filaments can be spread apart sufficiently to expose an entire surface area of the filaments, thus allowing the roving to more efficiently react in subsequent process steps. For example, a spread tow or roving can pass through a surface treatment step that is composed of a plasma system as described above. The roughened, spread fibers then can pass through a carbon nanotube-forming catalyst dip bath. The result is fibers of the glass roving that have catalyst particles distributed radially on their surface. The catalyzed-laden fibers of the roving then enter an appropriate carbon nanotube growth chamber, such as the rectangular chamber described above, where a flow through atmospheric pressure CVD or plasma enhanced-CVD process is used to synthesize carbon nanotubes at rates as high as several microns per second. The fibers of the roving, now having radially aligned carbon nanotubes, exit the carbon nanotube growth reactor.

Figure 6A:
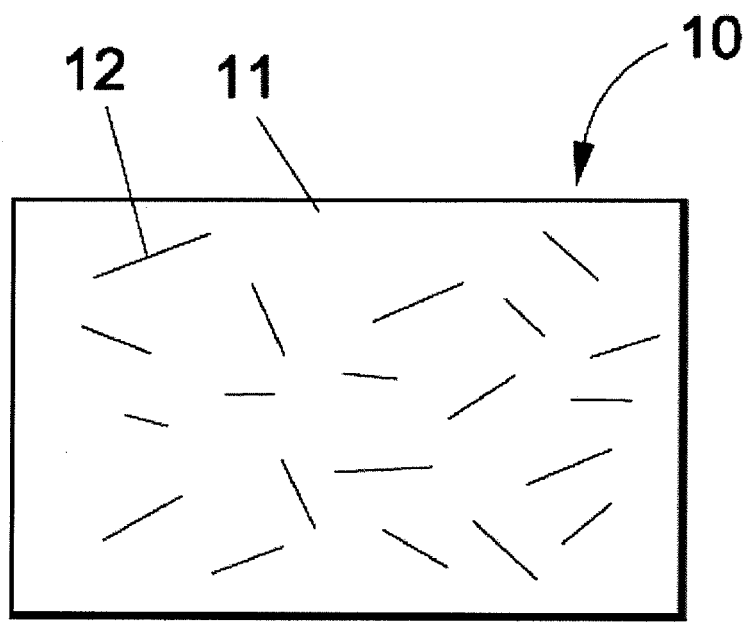
FIGS. 6A and 6B show schematic representations of illustrative composite materials containing a ceramic matrix and carbon nanotube-infused fiber materials.
Figure 6B:
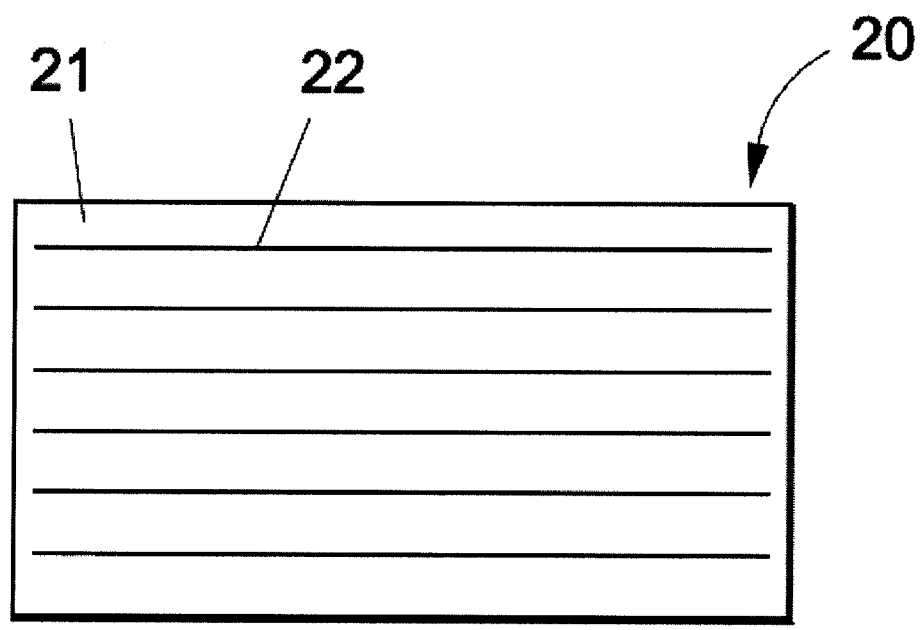

Some of the embodiments described herein will now be presented via schematic illustration. FIGS. 6A and 6B show schematic representations of illustrative composite materials containing a ceramic matrix and carbon nanotube-infused fiber materials. FIG. 6A shows an illustrative composite material 10 containing ceramic matrix 11 in which chopped carbon nanotube-infused fiber materials 12 are distributed. FIG. 6B shows an illustrative composite material 20 containing ceramic matrix 21 in which continuous carbon nanotube-infused fiber materials 22 are distributed.

Figure 7A:
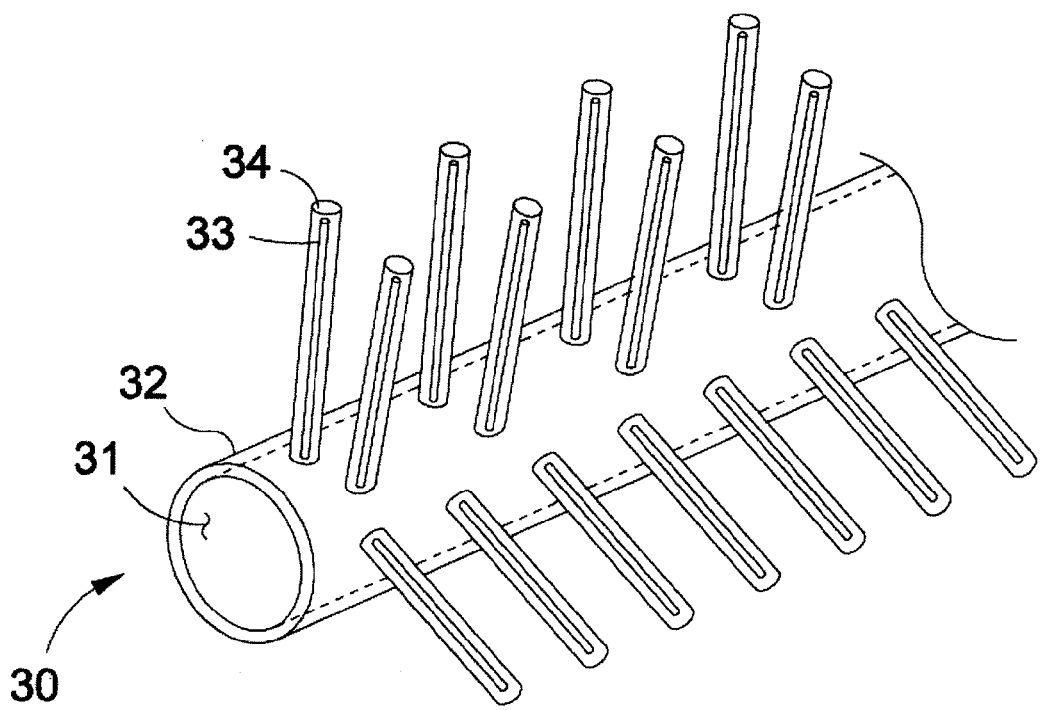
FIGS. 7A and 7B show schematic representations of illustrative carbon nanotube-infused fiber materials containing a passivation layer overcoating the carbon nanotubes.
Figure 7B:
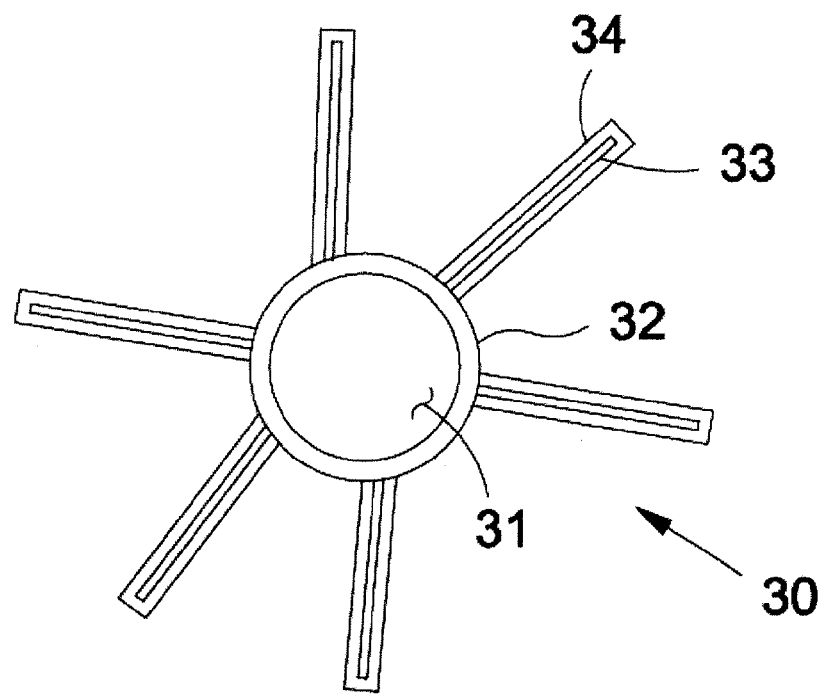

Certain details of the carbon nanotube-infused fiber materials of FIGS. 6A and 6B are shown in FIGS. 7A and 7B. FIGS. 7A and 7B show schematic representations of illustrative carbon nanotube-infused fiber materials containing a passivation layer overcoating the carbon nanotubes. FIG. 7A shows a perspective view of carbon nanotube-infused fiber material 30, and FIG. 7B shows an end view. Carbon nanotube-infused fiber material 30 contains an optional barrier coating 32 which can serve as an intermediate layer between fiber material 31 and carbon nanotubes 33. Carbon nanotubes 33 are overcoated with passivation layer 34, which can prevent undesirable chemical reactions of carbon nanotubes 33, for example.

It is understood that modifications which do not substantially affect the activity of the various embodiments of this invention are also included within the definition of the invention provided herein. Accordingly, the following Examples are intended to illustrate but not limit the present invention.

Example 1

Formation of a Carbon Nanotube-Infused Carbon Fiber Ceramic Matrix Composite

A silicon carbide matrix composite was prepared by colloidal processing of chopped carbon nanotube-infused carbon fibers. The chopped carbon fibers were Grafil, Inc. (Sacramento, Calif.) 34-700, 12 k filaments infused with carbon nanotubes having an average length of 55 μm prepared by the continuous infusion process described above. The fibers were chopped to 3 mm lengths. The silicon carbide matrix composite was prepared by mixing a colloidal mixture of silicon carbide nanoparticles and binder (SiC nanoparticles+binder=50% by weight) with the chopped carbon nanotube-infused carbon fibers (50% by weight). The resulting mixture of silicon carbide nanoparticles, binder, and carbon nanotube-infused carbon fibers was placed in a test tile press mold. In order to cure the binder and create a green ceramic tile, the mold containing the mixture was heated to 175° C. for 30 minutes under a pressure of 2500 psi. After curing of the green ceramic tile, the green tile was placed in an oven for final silicon carbide particle sintering. A temperature of 1950° C. was applied for 2 hours to form 3"×3.0"×0.25" test tiles. The resulting carbon nanotube-infused carbon fiber silicon carbide ceramic matrix composite, shown in FIG. 4, was fully sintered and had an electrical conductivity of 100.04 S/m.

Example 2

Formation of a Carbon Nanotube-Infused Carbon Fiber Ceramic Matrix Composite

A silicon carbide matrix composite was prepared by colloidal processing of chopped carbon nanotube-infused carbon fibers. The chopped carbon fibers were Grafil, Inc. (Sacramento, Calif.) 34-700, 12 k filaments infused with carbon nanotubes having an average length of 55 μm prepared by the continuous infusion process described above. The fibers were chopped to 3 mm lengths. The silicon carbide matrix composite was prepared by mixing a colloidal mixture of silicon carbide nanoparticles and binder to the chopped carbon nanotube-infused carbon fiber. The silicon carbide matrix composite was prepared by mixing a colloidal mixture of silicon carbide nanoparticles and binder (SiC nanoparticles+binder=90% by weight) with the chopped carbon nanotube-infused carbon fibers (10% by weight). The resulting mixture of silicon carbide nanoparticles, binder, and carbon nanotube-infused carbon fibers was placed in a test tile press mold. In order to cure the binder and create a green ceramic tile, the mold containing the mixture was heated to 175° C. for 30 minutes under a pressure of 2500 psi. After curing of the green ceramic tile, the green tile was placed in an oven for final silicon carbide particle sintering. A temperature of 1950° C. was applied for 1 hour to form 3"×3.0"×0.25" test tiles. The resulting carbon nanotube-infused carbon fiber silicon carbide ceramic matrix composite, shown in FIG. 5, was partially sintered and had an electrical conductivity of 5.45 S/m.

Example 3

Formation of a Carbon Nanotube-Infused Carbon Fiber Ceramic Matrix Composite

Figure 8:
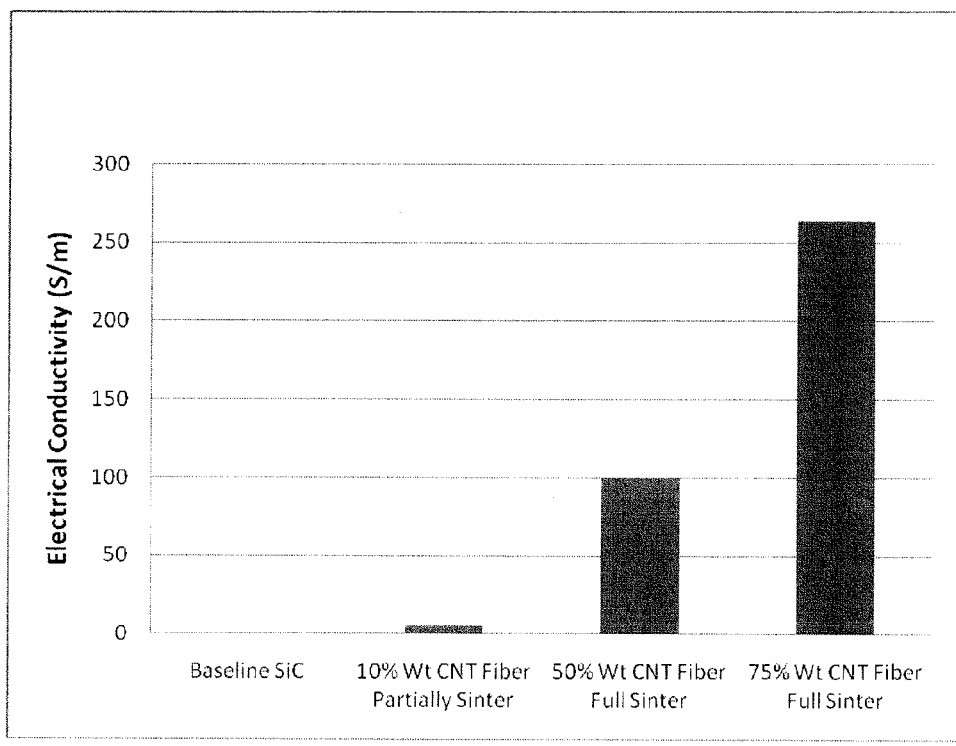
FIG. 8 shows a bar graph demonstrating improved electrical conductivity in illustrative carbon nanotube-infused carbon fiber ceramic matrix composites described in the examples below as compared to a ceramic matrix composite lacking carbon nanotubes.

A silicon carbide matrix composite was prepared by colloidal processing of chopped carbon nanotube-infused carbon fibers. The chopped carbon fibers were Grafil, Inc. (Sacramento, Calif.) 34-700, 12 k filaments infused with carbon nanotubes having an average length of 55 μm prepared by the continuous infusion process described above. The fibers were chopped to 3 mm lengths. The silicon carbide matrix composite was prepared by mixing a colloidal mixture of silicon carbide nanoparticles and binder (SiC nanoparticles+binder=75% by weight) with the chopped carbon nanotube-infused carbon fibers (25% by weight). The resulting mixture of silicon carbide nanoparticles, binder, and carbon nanotube-infused carbon fibers was placed in a test tile press mold. In order to cure the binder and create a green ceramic tile, the mold containing the mixture was heated to 175° C. for 30 minutes under a pressure of 2500 psi. After curing of the green ceramic tile, the green tile was placed in an oven for final silicon carbide particle sintering. A temperature of 1950° C. was applied for 2 hours to form 3"×3.0"×0.25" test tiles. The resulting carbon nanotube-infused carbon fiber silicon carbide ceramic matrix composite was fully sintered and had an electrical conductivity of 263.97 S/m. FIG. 8 shows a bar graph demonstrating improved electrical conductivity in the carbon nanotube-infused carbon fiber ceramic matrix composites described in Examples 1-3 as compared to a ceramic matrix composite lacking carbon nanotubes.

Although the invention has been described with reference to the disclosed embodiments, those skilled in the art will readily appreciate that these only illustrative of the invention. It should be understood that various modifications can be made without departing from the spirit of the invention.

What is claimed is:

1. A composite material comprising:
   a sintered ceramic matrix; and
   a carbon nanotube-infused fiber material distributed in the sintered ceramic matrix, wherein the carbon nanotube-infused fiber material comprises a fiber material, carbon nanotubes infused to the fiber material, and a passivation layer overcoating the carbon nanotubes.

2. The composite material of claim 1, wherein the sintered ceramic matrix comprises at least one compound selected from the group consisting of silicon carbide, tungsten carbide, chromium carbide, titanium carbide, titanium nitride, titanium boride, aluminum oxide, silicone nitride, Mullite, SiCN, $Fe_2N$, and $BaTiO_3$.

3. The composite material of claim 1, wherein the sintered ceramic matrix comprises a cement.

4. The composite material of claim 3, wherein the cement is selected from the group consisting of Portland cement, Pozzolan-lime cement, slag-lime cement, supersulfated cement, calcium aluminate cement, calcium sulfoaluminate cement, carbide-based cements, refractory cements, chromium-alumina cements, and nickel-magnesia iron-zirconium carbide cements and combinations thereof.

5. The composite material of claim 4, wherein the Portland cement is of a type selected from the group consisting Type I Portland cement, Type II Portland Cement, Type III Portland cement, Type IV Portland cement and Type V Portland cement.

6. The composite material of claim 1, wherein the fiber material is selected from the group consisting of glass fibers, carbon fibers, metal fibers, ceramic fibers, organic fibers, silicon carbide fibers, boron carbide fibers, silicon nitride fibers, aluminum oxide fibers and combinations thereof.

7. The composite material of claim 1, wherein the passivation layer comprises nickel, chromium, magnesium, titanium, silver, tin or titanium diboride.

8. The composite material of claim 1, wherein the fiber material is selected from the group consisting of chopped fibers and continuous fibers.

9. The composite material of claim 1, wherein the carbon nanotubes comprise between about 0.1% and about 10% of the composite material by weight.

10. The composite material of claim 1, wherein carbon nanotubes comprise between about 0.5% and about 40% of the carbon nanotube-infused fiber material by weight.

11. The composite material of claim 1, wherein the fiber material is uniformly distributed in the sintered ceramic matrix.

12. The composite material of claim 1, wherein the fiber material is non-uniformly distributed in the sintered ceramic matrix.

13. The composite material of claim 12, wherein the non-uniform distribution comprises a gradient distribution in the sintered ceramic matrix.

14. The composite material of claim 1, wherein the carbon nanotubes are substantially perpendicular to the longitudinal axis of the fiber material.

15. The composite material of claim 1, wherein the carbon nanotubes are substantially parallel to the longitudinal axis of the fiber material.

16. The composite material of claim 1, wherein the fiber material comprises silicon carbide fibers and the sintered ceramic matrix is selected from the group consisting of aluminum oxide and silicon nitride.

17. The composite material of claim 1, wherein the fiber material is selected from the group consisting of carbon fibers and silicon carbide fibers and the sintered ceramic matrix comprises silicon carbide.

18. The composite material of claim 1, wherein a weight percentage of the carbon nanotubes is determined by an average length of the carbon nanotubes.

19. The composite material of claim 18, wherein the weight percentage of the carbon nanotubes is further determined by a density of coverage of the carbon nanotubes infused to the fiber material.

20. The composite material of claim 19, wherein the density of coverage is up to about 15,000 carbon nanotubes/$\mu m^2$.

21. The composite material of claim 1, wherein an average length of the carbon nanotubes is between about 1 μm and about 500 μm.

22. The composite material of claim 1, wherein an average length of the carbon nanotubes is between about 1 μm and about 10 μm.

23. The composite material of claim 1, wherein an average length of the carbon nanotubes is between about 10 μm and about 100 μm.

24. The composite material of claim 1, wherein an average length of the carbon nanotubes is between about 100 μm and about 500 μm.

25. The composite material of claim 1, wherein an average length of the carbon nanotubes is sufficient to decrease the coefficient of thermal expansion of the composite material by about 4-fold or more relative to a composite material lacking carbon nanotubes.

26. The composite material of claim 1, wherein an average length of the carbon nanotubes is sufficient to improve the stiffness and wear resistance of the composite material by about 3-fold or more relative to a composite material lacking carbon nanotubes.

27. The composite material of claim 1, wherein an average length of the carbon nanotubes is sufficient to establish an electrically conductive pathway in the composite material.

28. An article comprising:
   a composite material comprising:
      a sintered ceramic matrix, and
      a carbon nanotube-infused fiber material distributed in the sintered ceramic matrix, wherein the carbon nanotube-infused fiber material comprises a fiber material, carbon nanotubes infused to the fiber material, and a passivation layer overcoating the carbon nanotubes.

* * * * *

UNITED STATES PATENT AND TRADEMARK OFFICE
CERTIFICATE OF CORRECTION

PATENT NO. : 8,168,291 B2
APPLICATION NO. : 12/953434
DATED : May 1, 2012
INVENTOR(S) : Tushar K. Shah et al.

It is certified that error appears in the above-identified patent and that said Letters Patent is hereby corrected as shown below:

Column 8, Line 62:   Replace "index (m,m)", with --index (n,m)--

Signed and Sealed this
Eighteenth Day of September, 2012

David J. Kappos
*Director of the United States Patent and Trademark Office*